(12) United States Patent
Maruo et al.

(10) Patent No.: US 11,560,934 B2
(45) Date of Patent: Jan. 24, 2023

(54) SPEED REDUCER AND SPEED REDUCER-EQUIPPED MOTOR

(71) Applicant: DENSO CORPORATION, Kiraya (JP)

(72) Inventors: Kazuki Maruo, Kariya (JP); Masahito Sakai, Kariya (JP); Fumihiro Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/427,230

(22) PCT Filed: Sep. 1, 2020

(86) PCT No.: PCT/JP2020/033064
§ 371 (c)(1),
(2) Date: Jul. 30, 2021

(87) PCT Pub. No.: WO2021/065293
PCT Pub. Date: Apr. 8, 2021

(65) Prior Publication Data
US 2022/0099161 A1 Mar. 31, 2022

(30) Foreign Application Priority Data

Sep. 30, 2019 (JP) .............................. JP2019-178402
Sep. 30, 2019 (JP) .............................. JP2019-178403
Sep. 30, 2019 (JP) .............................. JP2019-178404

(51) Int. Cl.
*F16H 1/32* (2006.01)
*H02K 7/116* (2006.01)

(52) U.S. Cl.
CPC .............. *F16H 1/32* (2013.01); *H02K 7/116* (2013.01); *F16H 2001/323* (2013.01); *F16H 2001/326* (2013.01)

(58) Field of Classification Search
CPC ................. F16H 1/32; F16H 2001/323; F16H 2001/326; H02K 7/116
See application file for complete search history.

(56) References Cited

U.S. PATENT DOCUMENTS 1,590,166 A * 6/1926 Howard .................... F16H 1/32
475/178
5,908,372 A * 6/1999 Janek ........................ F16H 1/32
475/168
(Continued)

FOREIGN PATENT DOCUMENTS

CN 104638830 A 5/2015
DE 102010000850 A1 * 7/2011 ........... F02M 39/005
(Continued)

OTHER PUBLICATIONS

Oct. 6, 2020 Search Report issued in International Patent Application No. PCT/JP2020/033064.

*Primary Examiner* — Sherry L Estremsky
(74) *Attorney, Agent, or Firm* — Oliff PLC

(57) ABSTRACT

A speed reducer includes a helical gear, an eccentric shaft and a slider plate. The speed reducer also includes a transmission gear and an output gear body. The transmission gear is supported at a first support part, transmission gear spinning is restricted by engagement with the slider plate, and the transmission gear revolves by the helical gear rotating with the eccentric shaft. The output gear body rotates by the transmission gear revolving. The transmission gear includes a pair of restricting protrusions protruding toward the slider plate side. The restricting protrusions have engaging surfaces that touch the slider plate wherein the engaging surfaces oppose the slider plate in a radial direction of the transmission gear. Surfaces at opposite sides of the restricting protrusions from the slider plate are formed, as seen in (Continued)

the axis direction of the transmission gear, to be convex to the opposite sides thereof from the slider plate.

18 Claims, 19 Drawing Sheets

(56) References Cited

U.S. PATENT DOCUMENTS

| | | | |
|---|---|---|---|
| 6,280,359 B1 * | 8/2001 | Moskob | F16H 1/32 475/149 |
| 9,267,583 B2 * | 2/2016 | Narovlansky | E05B 47/0611 |
| 11,371,586 B2 * | 6/2022 | Mahmoodi | F16H 1/32 |
| 2018/0201158 A1 | 7/2018 | Hoffmann | |

FOREIGN PATENT DOCUMENTS

| | | | |
|---|---|---|---|
| DE | 10 2013 216 242 A1 | | 2/2015 |
| DE | 102017125554 A1 | * | 5/2019 |
| FR | 1535643 A | * | 8/1968 |
| GB | 1220192 A | * | 1/1971 |
| JP | 2002295120 A | * | 10/2002 |
| JP | 2018-165531 A | | 10/2018 |
| JP | 2019-062679 A | | 4/2019 |
| KR | 20160018243 A | * | 2/2016 |

* cited by examiner

SPEED REDUCER AND SPEED REDUCER-EQUIPPED MOTOR

CROSS-REFERENCE TO RELATED APPLICATIONS

The present application is based on Japanese Patent Application Nos. 2019-178402, 2019-178403 and 2019-178404, filed on Sep. 30, 2019, and the disclosures thereof are incorporated into the present specification.

TECHNICAL FIELD

The present disclosure relates to a speed reducer and a speed reducer-equipped motor.

BACKGROUND ART

Patent Document 1 discloses a speed reducer-equipped motor provided with a speed reducer that reduces a speed of rotation of a motor. The speed reducer recited in this document is provided with: a worm gear fixed to a rotation axis of the motor; a worm wheel meshing with the worm gear; a gear that is revolved by rotation of the worm wheel, in a state in which spinning of the revolving gear is restricted; and an output shaft that is rotated by rotary force being transmitted thereto in accordance with the revolution of the revolving gear. A member that restricts spinning of the revolving gear is provided between the worm wheel and the revolving gear. The member that restricts spinning of the revolving gear is supported to be movable in a radial direction of the worm wheel.

RELATED ART REFERENCES

Patent References

Patent Document 1: Chinese Patent Application Publication No. 104,638,830

SUMMARY OF INVENTION

The speed reducer of the speed reducer-equipped motor recited in Patent Document 1 has a structure in which spinning of the revolving gear is restricted by a portion of the revolving gear engaging with the member that restricts spinning of the revolving gear. In this structure, it is important to assure strength of an engaging portion of the revolving gear that engages with the member that restricts spinning of the revolving gear.

Moreover, in the speed reducer of the speed reducer-equipped motor recited in Patent Document 1, if a contact state between the revolving gear and the member that restricts spinning of the revolving gear, a contact state between the member that restricts spinning of the revolving gear and a member that supports the restricting member, or the like changes, movement of the revolving gear may become irregular.

In consideration of the circumstances described above, a first object of the present disclosure is to provide a speed reducer and a speed reducer-equipped motor that may assure strength of an engaging portion of a revolving gear that engages with a member that restricts spinning of the revolving gear, and a second object of the present disclosure is to provide a speed reducer and a speed reducer-equipped motor that may suppress irregularity of movements of the revolving gear.

A speed reducer that achieves the objects described above includes: a first gear that is configured to rotate upon transmission of rotary force thereto; an eccentric shaft that is coupled to the first gear, the eccentric shaft including a support part that is offset, in a direction of a radius of rotation, from a rotation axis of the first gear; a spinning restriction member that is disposed at an outer side, in a radial direction, of the eccentric shaft; a transmission gear that is supported at the support part, spinning of the transmission gear being restricted by engagement of the transmission gear with the spinning restriction member, and the transmission gear being configured to revolve around the rotation axis of the first gear as a result of rotation of the first gear together with the eccentric shaft; and an output part that is configured to rotate as a result of revolution of the transmission gear, wherein: the transmission gear includes a restricting protrusion that protrudes toward a side of the transmission gear at which the spinning restriction member is disposed and that includes an engaging face configured to contact the spinning restriction member in a state in which the engaging face is disposed so as to oppose the spinning restriction member, and a face of the restricting protrusion other than the engaging face, as seen from an axial direction of the transmission gear, is formed in a convex shape that is convex toward an opposite side of the restricting protrusion from a side thereof at which the spinning restriction member is disposed. A speed reducer-equipped motor that achieves the objects described above is provided with this speed reducer.

Another speed reducer that achieves the objects described above includes: a first gear that is configured to rotate upon transmission of rotary force thereto; an eccentric shaft that is coupled to the first gear, the eccentric shaft including a support part that is offset, in a direction of a radius of rotation, from a rotation axis of the first gear; a spinning restriction member that is disposed at an outer side, in a radial direction, of the eccentric shaft; a transmission gear that is supported at the support part, spinning of the transmission gear being restricted by engagement of the transmission gear with the spinning restriction member, and the transmission gear being configured to revolve around the rotation axis of the first gear as a result of rotation of the first gear together with the eccentric shaft; and an output part that is configured to rotate as a result of revolution of the transmission gear, wherein: the transmission gear includes a restricting protrusion that protrudes toward a side of the transmission gear at which the spinning restriction member is disposed and that includes an engaging face configured to contact the spinning restriction member in a state in which the engaging face is disposed so as to oppose the spinning restriction member in a radial direction of the transmission gear, the spinning restriction member includes an engaged face that the engaging face is configured to contact, and the engaging face is disposed closer to the engaged face at a protrusion direction base end side of the restricting protrusion than at a protrusion direction distal end side of the restricting protrusion. A speed reducer-equipped motor that achieves the objects described above is provided with this speed reducer.

A further speed reducer that achieves the objects described above includes: a first gear that is configured to rotate upon transmission of rotary force thereto; an eccentric shaft that is coupled to the first gear, the eccentric shaft including a support part that is offset, in a direction of a radius of rotation, from a rotation axis of the first gear; a spinning restriction member that is disposed at an outer side, in a radial direction, of the eccentric shaft; a transmission gear that is supported at the support part, spinning of the transmission gear being restricted by engagement of the transmission gear with the spinning restriction member, and the transmission gear being configured to revolve around the rotation axis of the first gear as a result of rotation of the first gear together with the eccentric shaft; a sliding support member configured to support the spinning restriction member slidably in the direction of the radius of rotation of the first gear, the spinning restriction member being configured to slide at the sliding support member as a result of revolution of the transmission gear; and an output part that is configured to rotate as a result of revolution of the transmission gear, wherein: the transmission gear includes a restricting protrusion that protrudes toward a side of the transmission gear at which the spinning restriction member is disposed and that includes an engaging face configured to contact the spinning restriction member in a state in which the engaging face is disposed so as to oppose the spinning restriction member in a radial direction of the transmission gear, the spinning restriction member includes an engaged face and a first slider face, the engaging face being configured to contact the engaged face, and the first slider face being configured to slide against the sliding support member, the sliding support member includes a second slider face configured to slide against the first slider face, and as seen from an axial direction of the transmission gear, at least one of the engaging face or the engaged face is formed in a convex shape that is convex toward a side thereof at which the engaging face or the engaged face is disposed. A speed reducer-equipped motor that achieves the objects described above is provided with this speed reducer.

Still another speed reducer that achieves the objects described above includes: a first gear that is configured to rotate upon transmission of rotary force thereto; an eccentric shaft that is coupled to the first gear, the eccentric shaft including a support part that is offset, in a direction of a radius of rotation, from a rotation axis of the first gear; a spinning restriction member that is disposed at an outer side, in a radial direction, of the eccentric shaft; a transmission gear that is supported at the support part, spinning of the transmission gear being restricted by engagement of the transmission gear with the spinning restriction member, and the transmission gear being configured to revolve around the rotation axis of the first gear as a result of rotation of the first gear together with the eccentric shaft; a sliding support member configured to support the spinning restriction member slidably in the direction of the radius of rotation of the first gear, the spinning restriction member being configured to slide at the sliding support member as a result of revolution of the transmission gear; and an output part that is configured to rotate as a result of revolution of the transmission gear, wherein: the transmission gear includes a restricting protrusion that protrudes toward a side of the transmission gear at which the spinning restriction member is disposed and that includes an engaging face configured to contact the spinning restriction member in a state in which the engaging face is disposed so as to oppose the spinning restriction member in a radial direction of the transmission gear, the spinning restriction member includes an engaged face and a first slider face, the engaging face being configured to contact the engaged face, and the first slider face being configured to slide against the sliding support member, the sliding support member includes a second slider face configured to slide against the first slider face, and as seen from an axial direction of the transmission gear, the first slider face is formed in a convex shape that is convex toward a side thereof at which the second slider face is disposed. A speed reducer-equipped motor that achieves the objects described above is provided with this speed reducer.

A speed reducer and speed reducer-equipped motor according to the present disclosure provide an excellent effect in that strength may be assured of an engaging portion of a revolving gear that engages with a member that restricts spinning of the revolving gear. The speed reducer and speed reducer-equipped motor according to the present disclosure provide a further excellent effect in that movements of the revolving gear becoming irregular may be suppressed.

BRIEF DESCRIPTION OF DRAWINGS

The above-described object of the present disclosure and other objects, features and advantages of the present invention will be apparent from the following descriptions with reference to the accompanying drawings, wherein.

DETAILED DESCRIPTION

Figure 1:
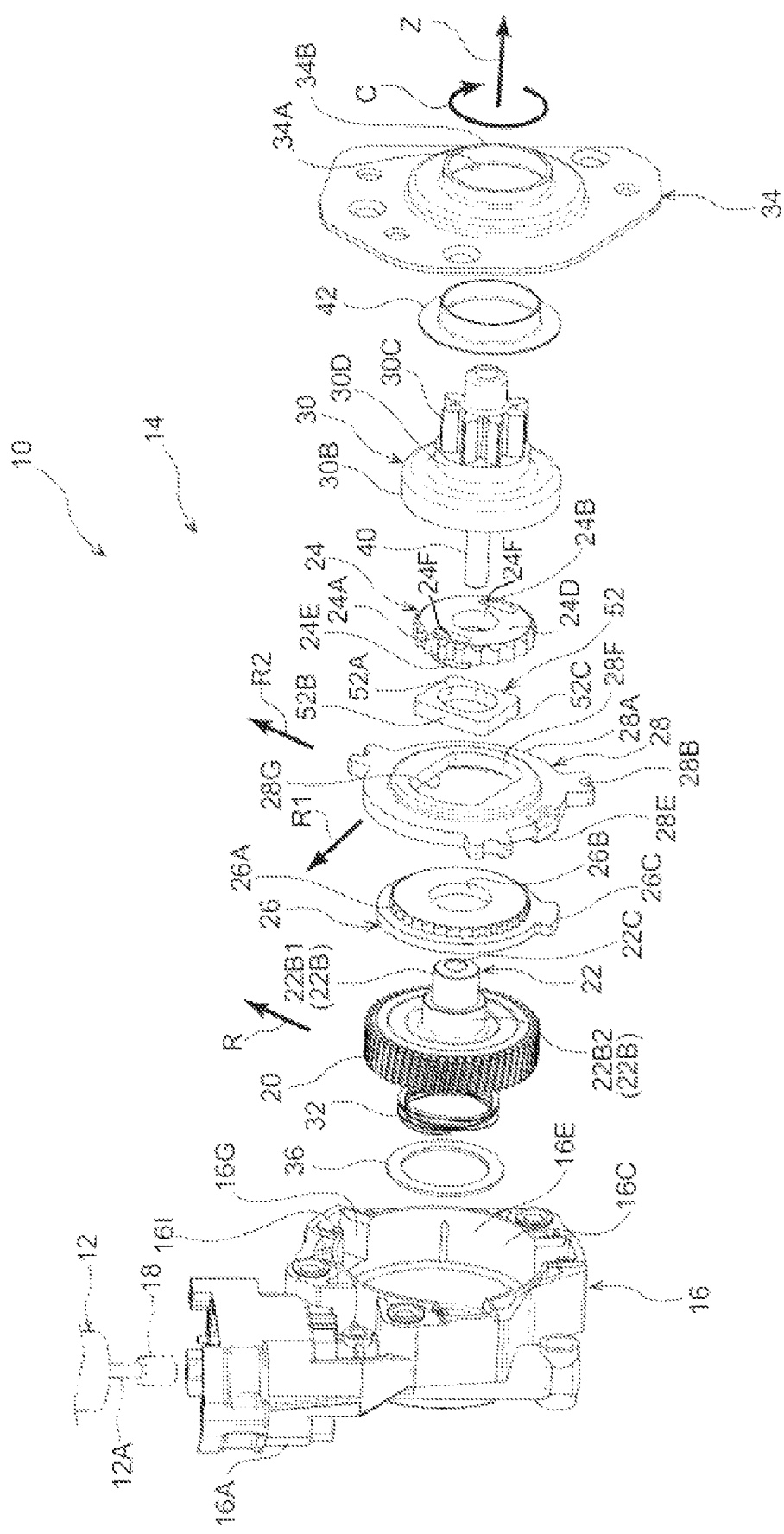
FIG. 1 is an exploded perspective view showing disassembly of a speed reducer-equipped motor.

A speed reducer-equipped motor 10 according to an exemplary embodiment of the present disclosure is described using FIG. 1 to FIG. 4B. The direction of an arrow Z, the direction of an arrow R and the direction of an arrow C, which are shown where appropriate in the drawings, indicate, respectively, one side in a rotation axis direction of a pinion gear 30C, which is an output gear, the outer side in a rotation radial direction of the pinion gear 30C, and one side in a rotation circumferential direction of the pinion gear 30C. The opposite side to the direction of arrow Z, the opposite side to the direction of arrow R and the opposite side to the direction of arrow C indicate, respectively, the other side in the direction of the rotation axis of the pinion gear 30C that is the output gear, the inner side in the rotation radial direction, and the other side in the rotation circumferential direction. Where simply an axis direction, a radial direction and a circumferential direction are referred to below without being particularly specified, these refer to the rotation axis direction, the rotation radial direction and the rotation circumferential direction of the pinion gear 30C.

As shown in FIG. 1, FIG. 2, FIG. 3, FIG. 4A and FIG. 4B, the speed reducer-equipped motor 10 according to the present exemplary embodiment is a power seat motor for moving a seat cushion of a vehicle seat in a seat vertical direction. The speed reducer-equipped motor 10 is equipped with a motor 12, which is a DC motor. The speed reducer-equipped motor 10 is further equipped with a speed reducer 14 for gearing down and transmitting rotations of a rotary shaft 12A of the motor 12 to an output gear body 30 that serves as an output part. The speed reducer-equipped motor 10 is provided with a housing 16. The motor 12 is mounted at the housing 16 and the speed reducer 14 is provided inside the housing 16.

The speed reducer 14 is provided with a worm gear 18, a helical gear 20 that serves as a first gear, and an eccentric shaft 22. The worm gear 18 is fixed to the rotary shaft 12A of the motor 12. The helical gear 20 meshes with the worm gear 18. The eccentric shaft 22 is provided integrally with the helical gear 20.

The speed reducer 14 is further provided with a transmission gear 24, a locking gear 26, and a fixed gear 28 that serves as a sliding support member. The transmission gear 24 and locking gear 26 are supported at the eccentric shaft 22. The fixed gear 28 meshes with the locking gear 26. The speed reducer 14 is also provided with a slider plate 52 that serves as a spinning restriction member. The slider plate 52 is supported at the fixed gear 28 and restricts spinning of the transmission gear 24 by the transmission gear 24 engaging with the slider plate 52. The speed reducer 14 is further provided with the output gear body 30, which meshes with the transmission gear 24 and includes the pinion gear 30C. An axis direction of the output gear body 30 is oriented in the same direction (the direction of arrow Z and the opposite direction from the direction of arrow Z) as an axis direction of the helical gear 20, the transmission gear 24 and the locking gear 26. The output gear body 30 is disposed to be coaxial with the helical gear 20.

The speed reducer-equipped motor 10 is provided with a spring 32 for suppressing looseness of the eccentric shaft 22, the helical gear 20 and the like in the axis direction. The speed reducer-equipped motor 10 is also provided with a cover plate 34 that is fixed to the housing 16, and the speed reducer 14 is accommodated in the housing 16.

Figure 2:
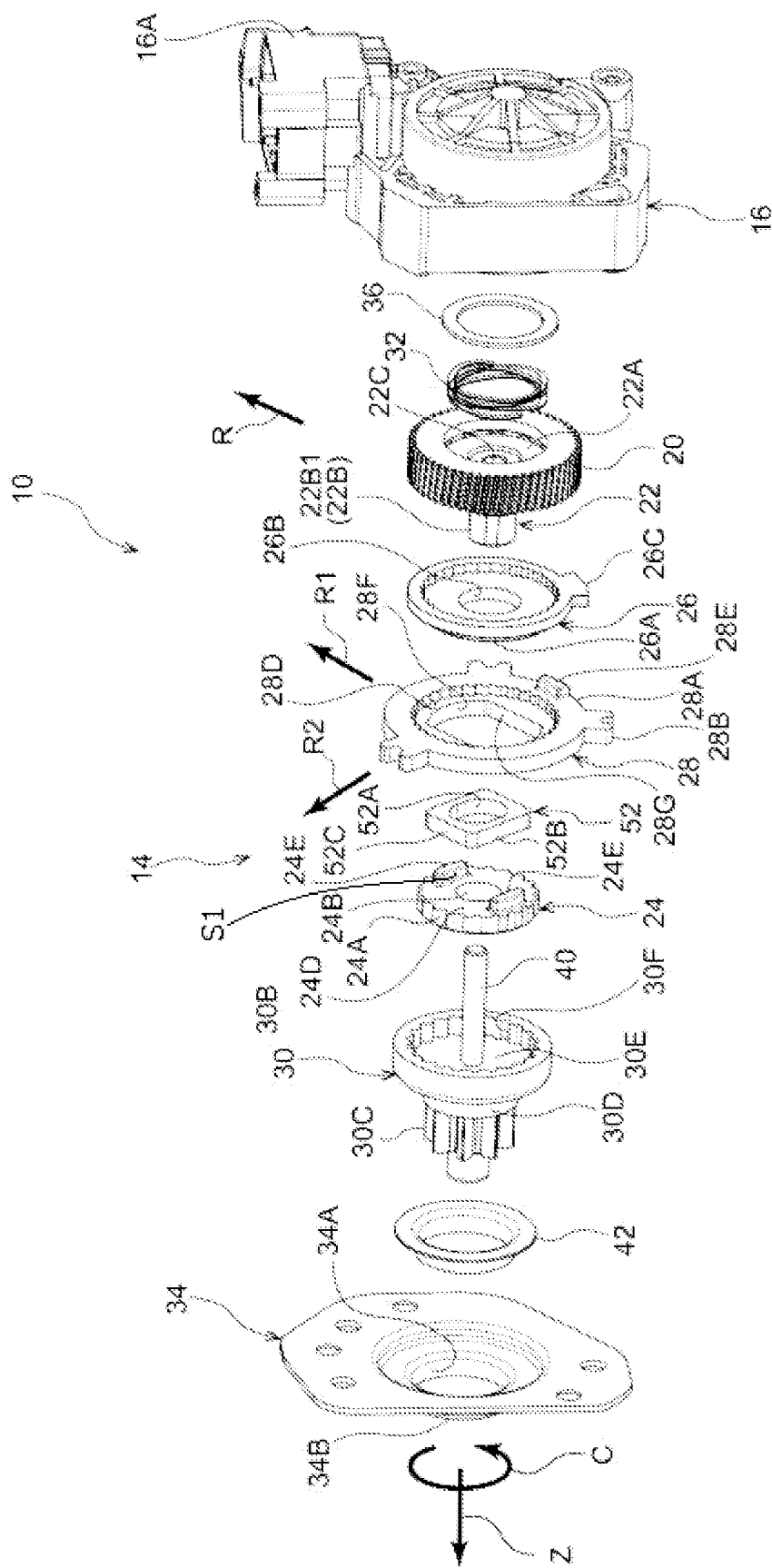
FIG. 2 is an exploded perspective view showing disassembly of the speed reducer-equipped motor, seen from the opposite side to FIG. 1.

As illustrated in FIG. 1 and FIG. 2, the housing 16 is formed using a resin material. The housing 16 is provided with a motor fixing portion 16A that fixes the rotary shaft 12A of the motor 12 in a state oriented in a direction intersecting the axis direction (the direction of arrow Z). The housing 16 is further provided with a speed reducer accommodation recess portion 16C, in which the speed reducer 14 is accommodated. The speed reducer accommodation recess portion 16C is formed in a recess shape of which an axis direction one side (the side in the direction of arrow Z) is open.

Figure 4A:
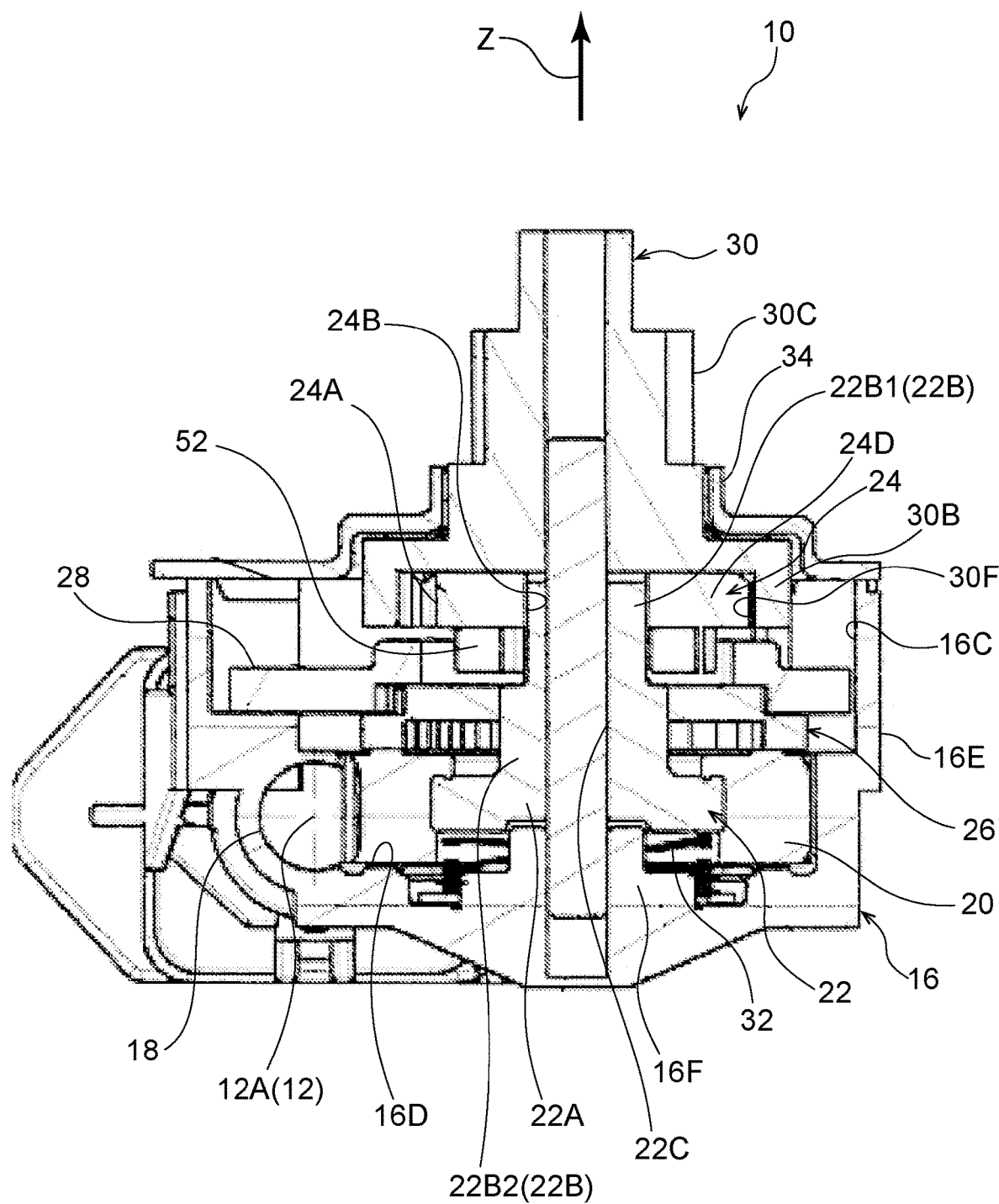
FIG. 4A is a sectional diagram showing a section in which the speed reducer-equipped motor is cut along a rotation axis direction of the output gear body.
Figure 4B:
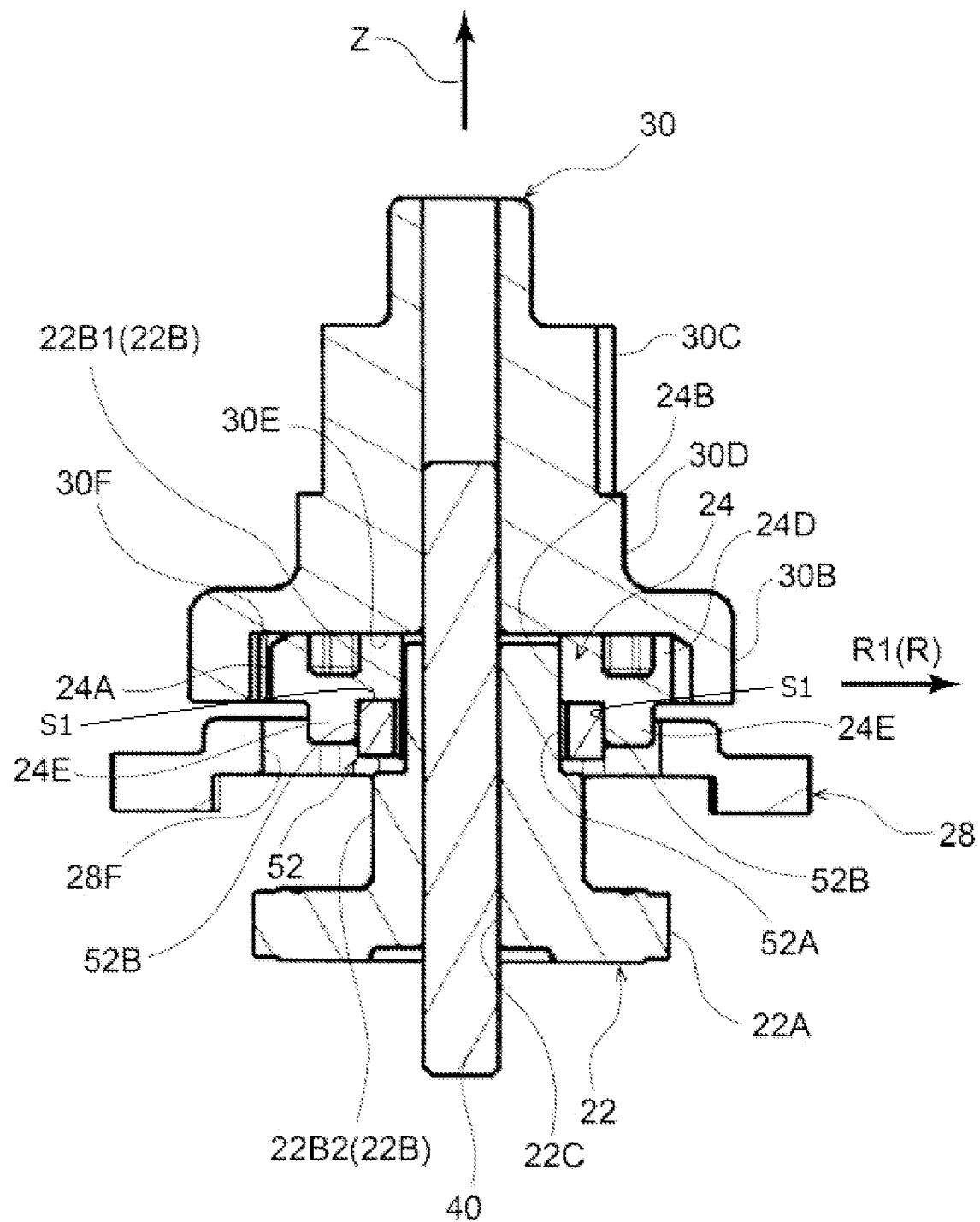
FIG. 4B is a sectional diagram showing a section of the eccentric shaft, fixed gear, transmission gear and output gear body that structure portions of the speed reducer cut along the rotation axis direction of the output gear body.

As shown in FIG. 1 and FIG. 4B, the speed reducer accommodation recess portion 16C includes a floor wall portion 16D and a side wall portion 16E. The floor wall portion 16D forms a floor of the speed reducer accommodation recess portion 16C. The side wall portion 16E extends to the axis direction one side from outer periphery portions of the floor wall portion 16D, and an inner periphery face of the side wall portion 16E is formed in a substantially circular tube shape. A circular tube-shaped boss portion 16F is provided standing from a central portion of the floor wall portion 16D of the speed reducer accommodation recess portion 16C. An end portion at the axis direction other side of a rotation center shaft 40, which is described below, is inserted into the boss portion 16F with some clearance. The spring 32 is disposed at the floor wall portion 16D around the boss portion 16F. A resin washer 36 is interposed between the floor wall portion 16D and the spring 32.

Three fixed gear engaging portions 16G are formed at inner periphery portions of the side wall portion 16E of the speed reducer accommodation recess portion 16C. By fitting to a portion of the fixed gear 28, which is described below, the fixed gear engaging portions 16G limit rotary displacement of the fixed gear 28 in the circumferential direction. Column portions 16I with circular column shapes are provided at the three fixed gear engaging portions 16G.

The cover plate 34 is formed using steel plate or the like. An exposure aperture 34A is formed in the cover plate 34, for exposing the pinion gear 30C outside the speed reducer accommodation recess portion 16C of the housing 16. An annular rib 34B is formed at a periphery edge portion of the exposure aperture 34A of the cover plate 34. The rib 34B is inflected toward the axis direction other side.

A tooth portion in a helical shape is formed at an outer periphery portion of the worm gear 18. In the state in which the worm gear 18 is fixed to the rotary shaft 12A, the motor 12 is fixed to the housing 16. Thus, the worm gear 18 is disposed at the inner periphery face side of the side wall portion 16E, at the side of the speed reducer accommodation recess portion 16C of the housing 16 at which the floor wall portion 16D is formed.

As illustrated in FIG. 1 and FIG. 2, the helical gear 20 is formed using a resin material. Plural outer teeth are formed at an outer periphery portion of the helical gear 20. The outer teeth mesh with the tooth portion of the worm gear 18. The eccentric shaft 22, which is described below, is fixed to an axial center portion of the helical gear 20 by insert-molding. The helical gear 20 is rotatably supported at the housing 16 via the eccentric shaft 22 and the rotation center shaft 40.

Figure 3:
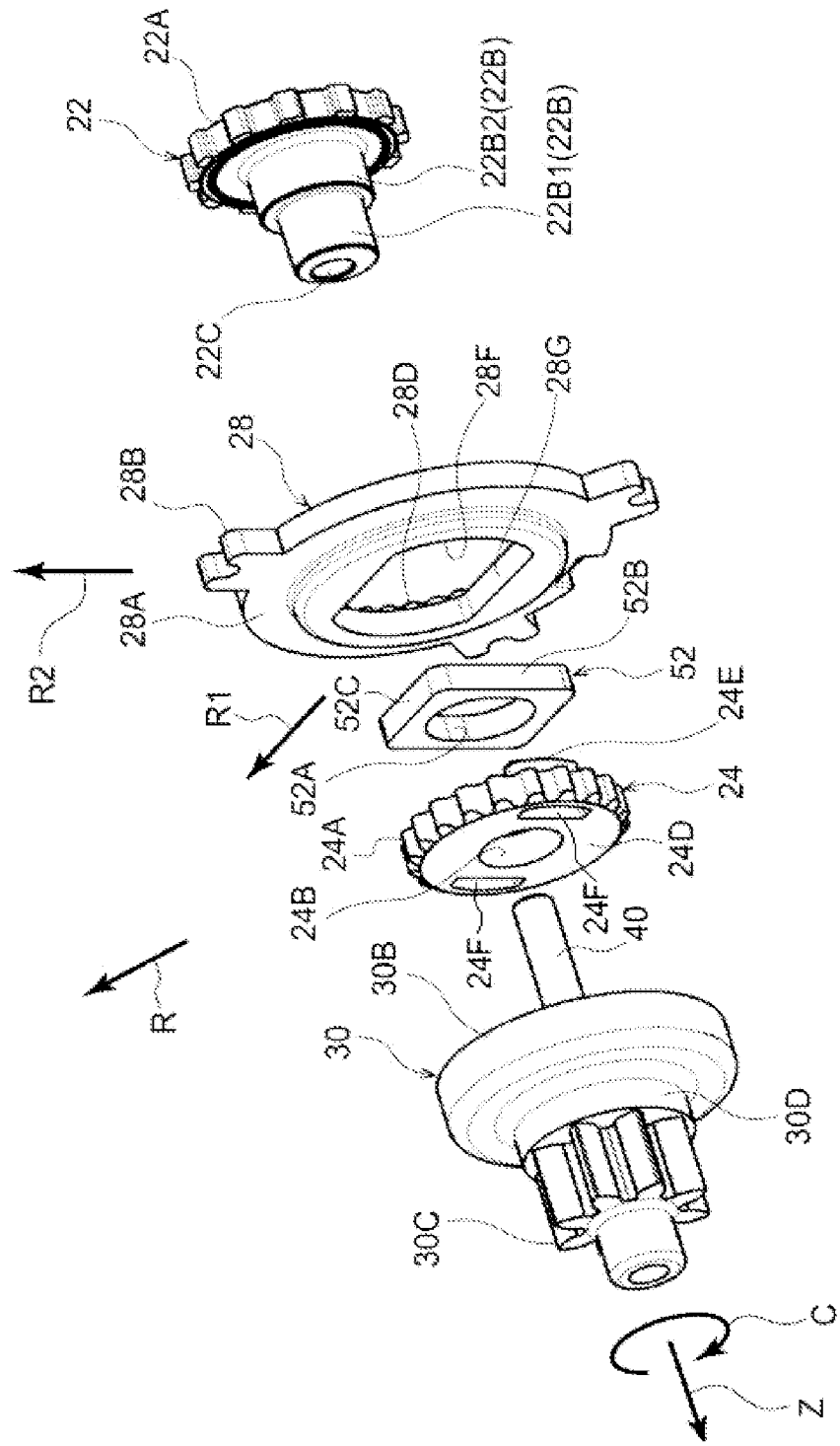
FIG. 3 is an exploded perspective view showing an eccentric shaft, a fixed gear, a transmission gear and an output gear body that structure portions of a speed reducer.

As illustrated in FIG. 2 and FIG. 3, the eccentric shaft 22 is formed using a metal material, and a portion of the eccentric shaft 22 is inserted in the helical gear 20. Thus, the eccentric shaft 22 is rotatable integrally with the helical gear 20. More specifically, the eccentric shaft 22 is provided with a circular plate portion 22A that is formed in a circular plate shape extending in the radial direction with a thickness direction in the axis direction. An outer periphery portion of the circular plate portion 22A is formed in a shape with indentations and protrusions along the circumferential direction. The circular plate portion 22A is fixed to an inner periphery portion of the helical gear 20 in a state in which the axial center of the circular plate portion 22A matches the axial center of the helical gear 20.

As shown in FIG. 1 and FIG. 3, the eccentric shaft 22 is provided with a support portion 22B that protrudes to the axis direction one side from a center portion of the circular plate portion 22A. The axis direction one side of the support portion 22B serves as a first support part 22B1 at which the transmission gear 24, which is described below, is rotatably supported. The axis direction other side of the support portion 22B serves as a second support part 22B2, which is specified with a larger diameter than the first support part 22B1. The locking gear 26, which is described below, is rotatably supported at the second support part 22B2. Axial centers of the first support part 22B1 and the second support part 22B2 are offset in one direction to the radial direction outer side from the axial center of the circular plate portion 22A.

As shown in FIG. 2, FIG. 3 and FIG. 4B, a rotation center shaft insertion hole 22C is formed in the eccentric shaft 22. The rotation center shaft insertion hole 22C penetrates in the axis direction through the circular plate portion 22A, the first support part 22B1 and the second support part 22B2. The rotation center shaft 40 is inserted into the rotation center shaft insertion hole 22C. The axial center of the rotation center shaft insertion hole 22C (and the axial center of the rotation center shaft 40 inserted into the rotation center shaft insertion hole 22C) matches the axial center of the circular plate portion 22A.

As illustrated in FIG. 2 and FIG. 4B, the output gear body 30 is formed using a metal material. The output gear body 30 is provided with a transmission gear engaging portion 30B that engages with the transmission gear 24. As shown in FIG. 2, an accommodation recess portion 30E is formed in the transmission gear engaging portion 30B. The accommodation recess portion 30E is open to the side thereof at which the transmission gear 24 is disposed (the axis direction other side). A transmission gear main body portion 24D of the transmission gear 24 is disposed inside the accommodation recess portion 30E. Plural inner teeth 30F are formed at an inner periphery portion at the radial direction outer side of the accommodation recess portion 30E. The inner teeth 30F mesh with outer teeth 24A of the transmission gear 24.

The output gear body 30 is provided with the pinion gear 30C at the axis direction one side relative to the transmission gear engaging portion 30B. The pinion gear 30C is disposed to be coaxial with the transmission gear engaging portion 30B. Plural outer teeth are formed at an outer periphery portion of the pinion gear 30C. A middle portion of the output gear body 30 between the transmission gear engaging portion 30B and the pinion gear 30C serves as a supported portion 30D, which is supported at the rib 34B formed at the cover plate 34. A bearing bush 42, which is formed using a resin material or the like, is engaged with an inner periphery face of the rib 34B. Therefore, metal-to-metal contact between the supported portion 30D of the output gear body 30 and the rib 34B of the cover plate 34 is prevented or impeded. The rotation center shaft 40, which is formed in a rod shape using a metal material, is fixed to an axial center portion of the output gear body 30 by press-fitting or the like.

As illustrated in FIG. 1 and FIG. 2, the fixed gear 28 is formed by press-forming or the like of a metal material. The fixed gear 28 is provided with a fixed gear main body portion 28A, which is formed in an annular shape as seen in the axis direction. The fixed gear 28 is also provided with three engaging protrusion portions 28B, which protrude to radial direction outer sides from the fixed gear main body portion 28A. In a state in which the engaging protrusion portions 28B are engaged with the fixed gear engaging portions 16G of the housing 16, the fixed gear 28 is fixed to the housing 16 by push nuts, which are not shown in the drawings, being engaged with the column portions 16I.

Plural inner teeth 28D are formed at an inner periphery portion of the fixed gear main body portion 28A. The locking gear 26, which is described below, meshes with the inner teeth 28D.

The fixed gear 28 is provided with a second limiting portion 28E that protrudes to the axis direction other side from the fixed gear main body portion 28A. The second limiting portion 28E protrudes to the axis direction other side from a portion of the circumferential direction of the fixed gear main body portion 28A.

A slider plate engaging hole 28F is formed at an axis center portion at the axis direction one side of the portion of the fixed gear main body portion 28A of the fixed gear 28 at which the inner teeth 28D are formed. Seen in the axis direction, edge portions of the slider plate engaging hole 28F are formed in a rectangular shape (a long quadrilateral shape), and the slider plate 52 is disposed inside the slider plate engaging hole 28F. A pair of first slider surfaces 52C of the slider plate 52 are described below. Faces of edge portions of the slider plate engaging hole 28F that are disposed to oppose the respective first slider surfaces 52C in the radial direction serve as second slider surfaces 28G. The first slider surfaces 52C and second slider surfaces 28G are disposed to oppose one another in close proximity. Thus, rotation of the slider plate 52 relative to the fixed gear 28 is restricted. Displacement of the slider plate 52 and the transmission gear 24 in one diametric direction R1 is allowed by the first slider surfaces 52C sliding on the second slider surfaces 28G. Therefore, when the eccentric shaft 22 rotates, the transmission gear 24 revolves around the axial center of the rotation center shaft 40 in a state in which spinning of the transmission gear 24 supported at the first support part 22B1 of the eccentric shaft 22 is restricted.

As illustrated in FIG. 1, FIG. 2, FIG. 3 and FIG. 4B, the transmission gear 24 is formed in a substantially circular plate shape by press-forming of a metal material or the like. The transmission gear 24 is provided with the transmission gear main body portion 24D at whose outer periphery portion the plural outer teeth 24A are formed. A support hole 24B is formed at a central portion of the transmission gear main body portion 24D. The support hole 24B is supported at the first support part 22B1 of the eccentric shaft 22. The transmission gear 24 is also provided with two restricting protrusions 24E, which protrude to the axis direction other side from a surface at the axis direction other side of the transmission gear main body portion 24D. The two restricting protrusions 24E are disposed equidistantly along the circumferential direction (at a pitch of 180°). Faces at the radial direction inner sides of the two restricting protrusions 24E are formed as planar engaging surfaces S1. Two engaged surfaces 52B, which are described below, are provided at the slider plate 52. The engaging surfaces S1 engage with (touching and sliding) the respective engaged surfaces 52B. Turning (spinning) of the transmission gear 24 around the first support part 22B1 of the eccentric shaft 22 is restricted by the two engaging surfaces S1 of the restricting protrusions 24E being engaged with the engaged surfaces 52B. In the present exemplary embodiment, portions of the transmission gear main body portion 24D are pressed toward the axis direction other side. Thus, the two restricting protrusions 24E protrude to the axis direction other side from the surface at the axis direction other side of the transmission gear main body portion 24D. Correspondingly, indentations 24F (see FIG. 3) are formed in the axis direction one side of the transmission gear main body portion 24D at regions that correspond with the two restricting protrusions 24E in the circumferential direction.

As illustrated in FIG. 1 and FIG. 3, the slider plate 52 is formed using a plate fabricated of metal. As seen in the axis direction, the slider plate 52 is formed in a rectangular shape (a long quadrilateral shape). The slider plate 52 is disposed inside the slider plate engaging hole 28F formed in the fixed gear 28, between the two restricting protrusions 24E of the transmission gear 24. Faces at outer periphery portions of the slider plate 52 that are disposed to respectively oppose the two restricting protrusions 24E in the radial direction serve as the engaged surfaces 52B in planar shapes. In the state in which the slider plate 52 is disposed between the two restricting protrusions 24E of the transmission gear 24, displacement of the transmission gear 24 relative to the slider plate 52 in the direction in which the engaged surfaces 52B oppose the engaging surfaces S1 of the restricting protrusions 24E (the one diametric direction R1) is restricted, in addition to which rotation (spinning) of the transmission gear 24 relative to the slider plate 52 is restricted. Meanwhile, displacement of the transmission gear 24 relative to the slider plate 52 in the direction in which the engaged surfaces 52B slide at the engaging surfaces S1 of the restricting protrusions 24E (another diametric direction R2, which is orthogonal to the one diametric direction R1) is allowed by the engaging surfaces S1 of the restricting protrusions 24E sliding on the engaged surfaces 52B. A pair of faces of outer periphery portions of the slider plate 52 that are disposed to oppose the second slider surfaces 28G of the slider plate engaging hole 28F in close proximity therewith serve as the first slider surfaces 52C in planar shapes. An insertion hole 52A in a long hole shape (a long hole shape whose length direction is in the another diametric direction R2) is formed at an axial center portion of the slider plate 52. The first support part 22B1 of the eccentric shaft 22 is inserted into the insertion hole 52A. In the present exemplary embodiment, a spacing between the pair of engaged surfaces 52B of the slider plate 52 is set to a smaller dimension than a spacing between the pair of first slider surfaces 52C. Thus, as seen in the axis direction, the slider plate 52 is formed in a rectangular shape, the longer sides of which are the pair of engaged surfaces 52B and the shorter sides of which are the pair of first slider surfaces 52C.

As illustrated in FIG. 1 and FIG. 2, the locking gear 26 is formed in a circular plate shape by press-forming of a metal material or the like, similarly to the transmission gear 24. Outer teeth 26B are formed along the whole circumference of an outer periphery portion of the locking gear 26. The outer teeth 26B mesh with the inner teeth 28D of the fixed gear 28. A support hole 26B is formed at a central portion of the locking gear 26. The support hole 26B is supported at the second support part 22B2 of the eccentric shaft 22. The locking gear 26 is provided with a first limiting portion 26C. The first limiting portion 26C protrudes to the radial direction outer side and is formed in a handfan shape as seen in the axis direction. The first limiting portion 26C is provided at one region in the circumferential direction of the locking gear 26. In the state in which the outer teeth 26A of the locking gear 26 mesh with the inner teeth 28D of the fixed gear 28, the first limiting portion 26C is disposed along the surface at the axis direction other side of the fixed gear main body portion 28A of the fixed gear 28.

=Operation and Effects of the Present Exemplary Embodiment=

Now, operation and effects of the present exemplary embodiment are described.

As shown in FIG. 1 and FIG. 2, according to the speed reducer-equipped motor 10 according to the present exemplary embodiment, when the rotary shaft 12A of the motor 12 rotates, the worm gear 18 rotates. When the worm gear 18 rotates, the helical gear 20 meshing with the worm gear 18 rotates together with the eccentric shaft 22.

When the eccentric shaft 22 rotates, the transmission gear 24 supported at the first support part 22B1 of the eccentric shaft 22 revolves around the rotation center shaft 40. To describe this in more detail, when the eccentric shaft 22 rotates, the transmission gear 24 reciprocatingly moves in the radial direction (the direction of arrow R2 and the direction opposite to arrow R2) while the engaging surfaces S1 of the restricting protrusions 24E of the transmission gear 24 slide on the engaged surfaces 52B of the slider plate 52. Meanwhile, the slider plate 52 and the transmission gear 24 reciprocatingly move in the radial direction (the direction of arrow R1 and the direction opposite to arrow R1) while the first slider surfaces 52C of the slider plate 52 slide on the second slider surfaces 28G of the fixed gear 28. As a result, the transmission gear 24 revolves around the axial center of the rotation center shaft 40 in a state in which spinning of the transmission gear 24 supported at the first support part 22B1 of the eccentric shaft 22 is restricted.

As shown in FIG. 1 and FIG. 2, when the transmission gear 24 revolves, rotary force associated with this revolving is transmitted from the outer teeth 24A of the transmission gear 24 to the output gear body 30 via the inner teeth 30F of the output gear body 30. As a result, the output gear body 30 rotates and, via a gear that meshes with the pinion gear 30C of the output gear body 30, the power seat of the vehicle may be operated.

When the eccentric shaft 22 rotates, the locking gear 26 supported at the second support part 22B2 of the eccentric shaft 22 revolves and spins around the rotation center shaft 40 while remaining meshed with the fixed gear 28. When the first limiting portion 26C of the locking gear 26 abuts against the second limiting portion 28E of the fixed gear 28, the revolving and spinning of the locking gear 26 is restricted. As a result, the rotation of the eccentric shaft 22 and helical gear 20 is stopped, and the rotation of the output gear body 30 stops (the rotation is limited). Therefore, application of excessive force from the speed reducer-equipped motor 10 to the vehicle seat may be prevented or suppressed, and a deterioration in seating comfort due to members structuring the vehicle seat deforming may be prevented or suppressed.

In the present exemplary embodiment, the slider plate 52 that restricts spinning of the transmission gear 24 is disposed between the two restricting protrusions 24E of the transmission gear 24. Therefore, an increase in a dimension in the radial direction of the slider plate 52 may be suppressed in comparison with a structure in which the two restricting protrusions 24E of the transmission gear 24 engage with inner periphery portions of the slider plate 52. As a result, the bodies of the speed reducer 14 and the speed reducer-equipped motor 10 that includes the speed reducer 14 may be reduced in size in the radial direction.

The speed reducer 14 constituting part of the speed reducer-equipped motor 10 that is described above is a speed reducer employing what is known as an epicyclic geartrain. Therefore, it is sufficient to appropriately select the gears whose rotation is to be restricted in consideration of a speed reduction ratio required of the speed reducer 14 and suchlike. That is, it is sufficient to appropriately select and employ any configuration among planetary, solar and star geartrains—such as a 2K-H epicyclic geartrain, a 3K epicyclic geartrain or the like—in consideration of the speed reduction ratio required of the speed reducer 14 and suchlike.

=Structures for Assuring Strength of the Restricting Protrusions 24E of the Transmission Gear 24=

As described above, when the transmission gear 24 revolves around the rotation center shaft 40, the slider plate 52 and the transmission gear 24 reciprocatingly move in the radial direction (the direction of arrow R1 and the direction opposite to arrow R1). As a result, loads are repeatedly applied from the slider plate 52 to the restricting protrusions 24E of the transmission gear 24 (and from the restricting protrusions 24E of the transmission gear 24 to the slider plate 52) in the direction of arrow R1 and the direction opposite to arrow R1. In particular, if the transmission gear 24 is made smaller in order to reduce the size of the speed reducer-equipped motor 10, loads applied to the restricting protrusions 24E of the transmission gear 24 by the slider plate 52 are increased. Therefore, it is important to provide the restricting protrusions 24E with the strength to withstand these loads. Below, structures for assuring strength against loads applied to the restricting protrusions 24E of the transmission gear 24 from the slider plate 52 are described.

Figure 5:
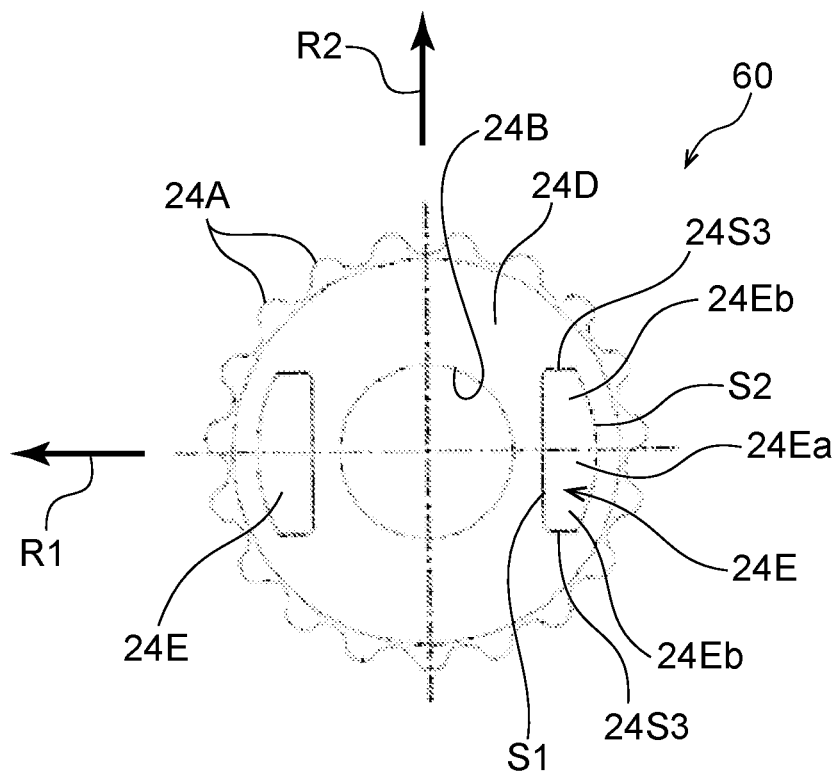
FIG. 5 is a plan view of a transmission gear to which a first strength measure is applied, seen from an axis direction other side thereof.
Figure 6:
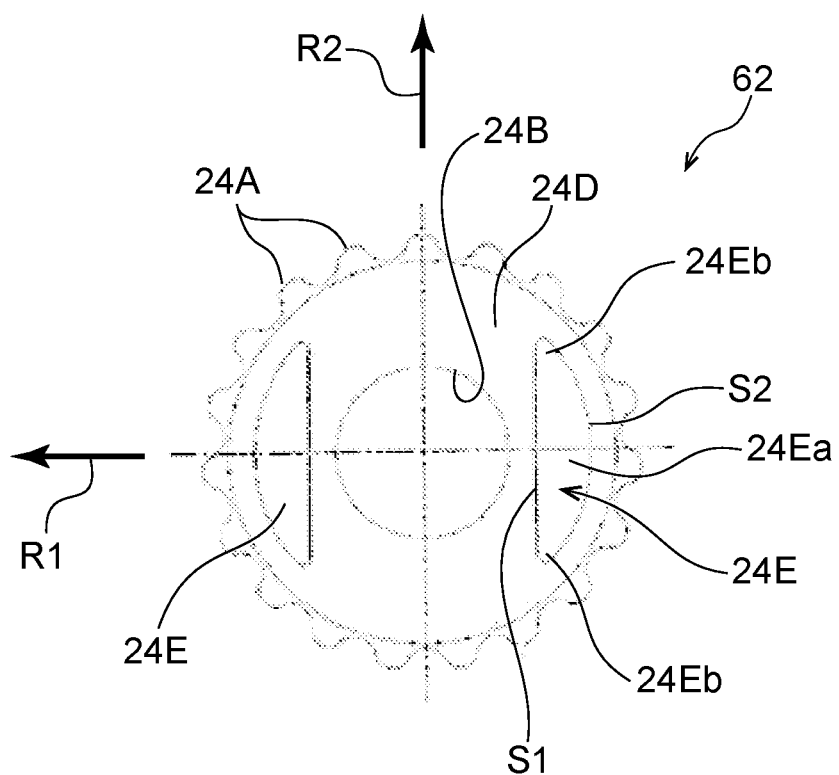
FIG. 6 is a plan view of a transmission gear to which a second strength measure is applied, seen from the axis direction other side thereof.
Figure 7:
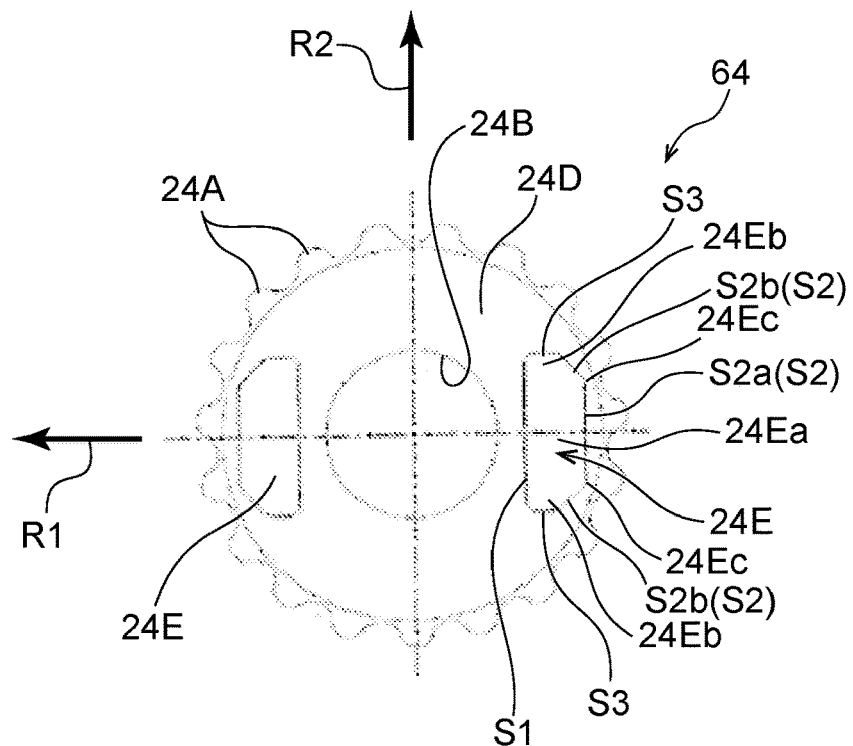
FIG. 7 is a plan view of a transmission gear to which a third strength measure is applied, seen from the axis direction other side thereof.

FIG. 5, FIG. 6 and FIG. 7 show transmission gears 60, 62 and 64 to which, respectively, a first strength measure, a second strength measure and a third strength measure are applied. In the transmission gear 60, 62 or 64, a surface S2 at the opposite side of each restricting protrusion 24E from the side thereof at which the slider plate 52 is disposed (see FIG. 3 and the like), as seen in the axis direction of the transmission gear 60, 62 or 64, is formed in a convex shape toward the opposite side from the slider plate 52 (the radial direction outer side of the transmission gear 60, 62 or 64). Therefore, a minimum thickness of the restricting protrusion 24E at a central portion 24Ea thereof in the circumferential direction of the transmission gear 60, 62 or 64 is greater than a minimum thickness of the restricting protrusion 24E at each of end portions 24Eb of the restricting protrusion 24E in the circumferential direction of the transmission gear 60, 62 or 64. Portions of the transmission gears 60, 62 and 64 to which, respectively, the first strength measure, second strength measure and third strength measure are applied that correspond with the transmission gear 24 described above are assigned the same reference symbols as the corresponding portions of the transmission gear 24.

—The Transmission Gear 60 to which the First Strength Measure is Applied—

As shown in FIG. 5, in the transmission gear 60 to which the first strength measure is applied, the surface S2 at the opposite side of each restricting protrusion 24E from the side thereof at which the slider plate 52 is disposed is curved in a cylinder surface shape as seen in the axis direction of the transmission gear 60. Therefore, in the transmission gear 60 to which the first strength measure is applied, a thickness T of the restricting protrusion 24E in the direction of sliding of the slider plate 52 against the fixed gear 28 (the direction of arrow R1 and the opposite direction to arrow R1) progressively increases from each end side toward the center of the restricting protrusion 24E in the circumferential direction of the transmission gear 60. In the transmission gear 60 to which the first strength measure is applied, two end faces S3 of the restricting protrusion 24E in the direction of sliding of the transmission gear 60 against the slider plate 52 (the direction of arrow R2 and the opposite direction to arrow R2) are formed in planar shapes whose faces are oriented in the direction of arrow R2 and the opposite direction to arrow R2.

In the transmission gear 60 to which the first strength measure is applied that is described above, a projected area of each restricting protrusion 24E may be increased compared to a structure in which the shape of the restricting protrusion 24E (the shape thereof seen in the axis direction of the transmission gear 60) is formed as a rectangular shape. Therefore, when a load is applied from the slider plate 52 to the restricting protrusion 24E, a stress produced at a protrusion direction base end side of the restricting protrusion 24E may be reduced. Thus, strengths of the restricting protrusions 24E may be assured.

—The Transmission Gear 62 to which the Second Strength Measure is Applied—

As shown in FIG. 6, in the transmission gear 62 to which the second strength measure is applied, similarly to the transmission gear 60 to which the first strength measure is applied (see FIG. 5), the surface S2 at the opposite side of each restricting protrusion 24E from the slider plate 52 is curved in a cylinder surface shape as seen in the axis direction of the transmission gear 62. Therefore, in the transmission gear 62 to which the second strength measure is applied, the thickness T of the restricting protrusion 24E in the direction of sliding of the slider plate 52 against the fixed gear 28 (the direction of arrow R1 and the opposite direction to arrow R1) progressively increases from each end side toward the center of the restricting protrusion 24E in the circumferential direction of the transmission gear 62. In the transmission gear 62 to which the second strength measure is applied, the two end portions 24E*b* of the restricting protrusion 24E in the direction of sliding of the transmission gear 62 against the slider plate 52 (the direction of arrow R2 and the opposite direction to arrow R2) taper to sharp points in the direction of arrow R2 and the opposite direction to arrow R2. Portions of the transmission gear 62 to which the second strength measure is applied that correspond with portions of the transmission gear 60 described above to which the first strength measure is applied are assigned the same reference symbols as the corresponding portions of the transmission gear 60.

In the transmission gear 62 to which the second strength measure is applied as described above, a projected area of each restricting protrusion 24E may be increased compared to a structure in which the shape of the restricting protrusion 24E (the shape thereof seen in the axis direction of the transmission gear 62) is formed as the restricting protrusion 24E of the transmission gear 60 to which the first strength measure has been applied. Therefore, when a load is applied from the slider plate 52 to the restricting protrusion 24E, a stress produced at a protrusion direction base end side of the restricting protrusion 24E may be even further reduced. Thus, strengths of the restricting protrusions 24E may be assured.

—The Transmission Gear 64 to which the Third Strength Measure is Applied—

As shown in FIG. 7, in the transmission gear 64 to which the third strength measure is applied, the surface S2 at the opposite side of each restricting protrusion 24E from the side thereof at which the slider plate 52 is disposed is inflected in a polygonal shape as seen in the axis direction of the transmission gear 64. To describe this in more detail, two inflection portions 24E*c* are formed in the surface S2 at the opposite side of the restricting protrusion 24E from the side thereof at which the slider plate 52 is disposed. Accordingly, a central portion S2*a*, in the circumferential direction of the transmission gear 64, of the surface S2 at the opposite side of the restricting protrusion 24E from the slider plate 52 is formed in a planar shape whose face is oriented in the direction of arrow R1 and the opposite direction to arrow R1. Two end portions S2*b*, in the circumferential direction of the transmission gear 64, of the surface S2 at the opposite side of the restricting protrusion 24E from the slider plate 52 are formed in planar shapes that are angled relative to the the direction of arrow R1 and the opposite direction to arrow R1. Thus, in the transmission gear 64 to which the third strength measure is applied, the thickness T of the restricting protrusion 24E in the direction of sliding of the slider plate 52 against the fixed gear 28 (the direction of arrow R1 and the opposite direction to arrow R1) progressively increases from each end side toward the center of the restricting protrusion 24E in the circumferential direction of the transmission gear 62, and is a constant thickness dimension in the central region of the restricting protrusion 24E. In the transmission gear 64 to which the third strength measure is applied, two end faces S3 of the restricting protrusion 24E in the direction of sliding of the transmission gear 64 against the slider plate 52 (the direction of arrow R2 and the opposite direction to arrow R2) are formed in planar shapes whose faces are oriented in the direction of arrow R2 and the opposite direction to arrow R2. Thus, the shape of the restricting protrusion 24E as seen in the axis direction of the transmission gear 64 is formed as a hexagonal shape. Portions of the transmission gear 64 to which the third strength measure is applied that correspond with portions of the transmission gear 60 described above to which the first strength measure is applied and the like are assigned the same reference symbols as the corresponding portions of the transmission gear 60 and the like.

In the transmission gear 64 to which the third strength measure is applied that is described above, a projected area of each restricting protrusion 24E may be increased compared to a structure in which the shape of the restricting protrusion 24E (the shape thereof seen in the axis direction of the transmission gear 64) is formed as a rectangular shape. Therefore, when a load is applied from the slider plate 52 to the restricting protrusion 24E, a stress produced at a protrusion direction base end side of the restricting protrusion 24E may be reduced. Thus, strengths of the restricting protrusions 24E may be assured.

The structures of the transmission gears 60, 62 and 64 to which, respectively, the first strength measure, second strength measure and third strength measure are applied may be combined with one another.

=First Bending Strength Measure, Second Bending Strength Measure and Third Bending Strength Measure=

Figure 8:
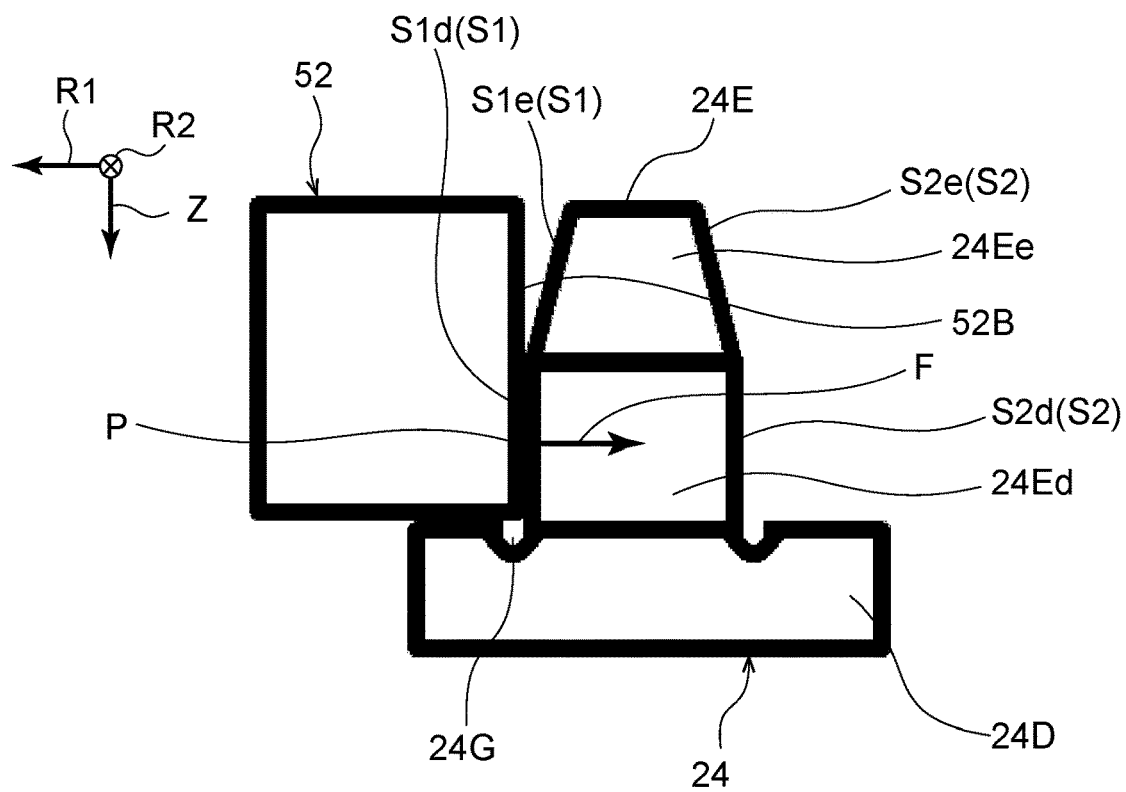
FIG. 8 is a side view schematically showing an engaging portion between an engaging protrusion portion of a transmission gear and a slider plate, to which a first bending strength measure is applied.
Figure 9:
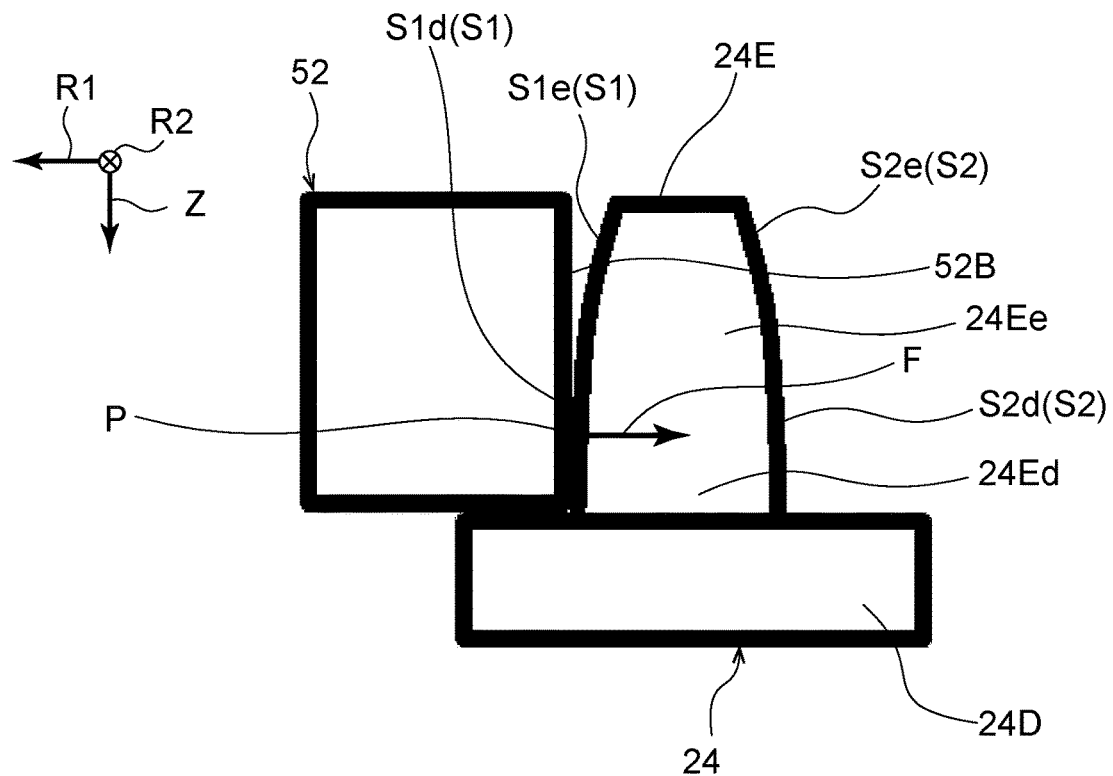
FIG. 9 is a side view schematically showing an engaging portion between an engaging protrusion portion of a transmission gear and a slider plate, to which a second bending strength measure is applied.
Figure 10:
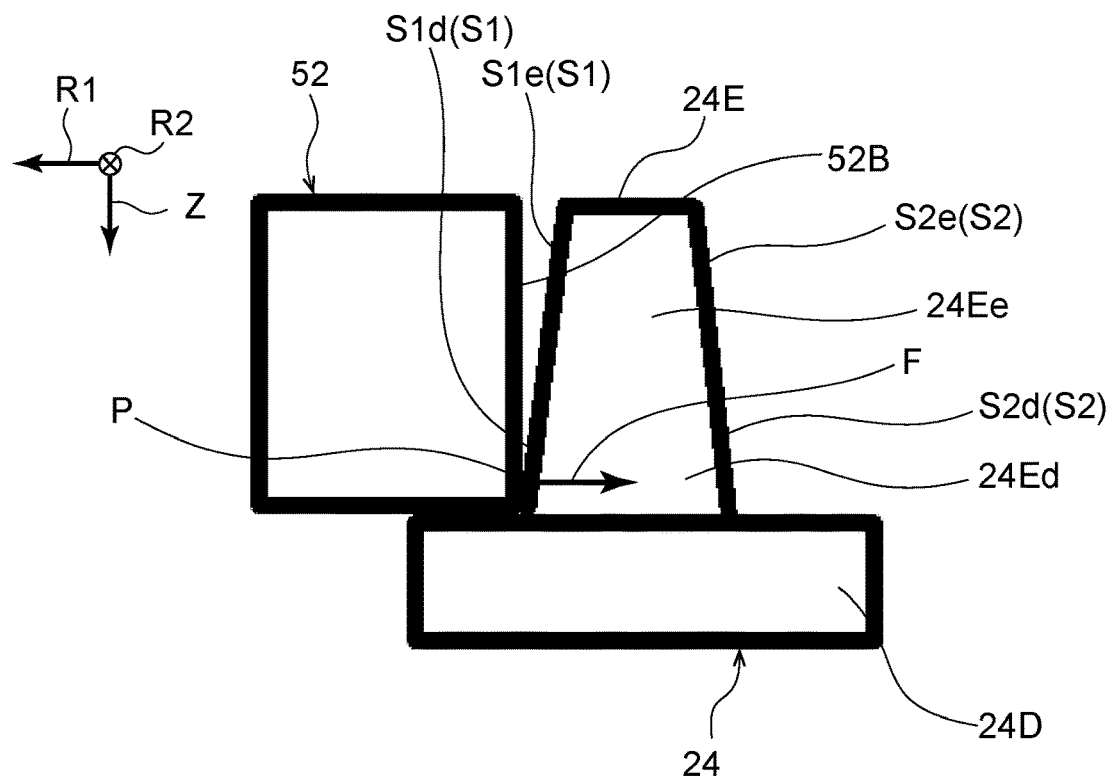
FIG. 10 is a side view schematically showing an engaging portion between an engaging protrusion portion of a transmission gear and a slider plate, to which a third bending strength measure is applied.

If loads acting on the restricting protrusions 24E of the transmission gear 24 from the slider plate 52 increase, bending stresses produced in the restricting protrusions 24E increase. Accordingly, in order to reduce bending stresses produced in the restricting protrusions 24E, the shapes of the restricting protrusions 24E are formed as tapering shapes in accordance with a first bending strength measure, a second bending strength measure and a third bending strength measure, which are illustrated in FIG. 8, FIG. 9 and FIG. 10. Members and portions that are not specifically described in the following descriptions have the same structures as in the speed reducer-equipped motor 10 described above.

—First Bending Strength Measure—

To be specific, in a structure in which the first bending strength measure is applied, as shown in FIG. 8, a protrusion direction base end side S1*d* of the engaging surface S1 of each restricting protrusion 24E (a portion corresponding with a base end portion 24E*d* in the protrusion direction of the restricting protrusion 24E) is formed in a planar shape along the axis direction of the transmission gear 24 and the direction of sliding of the transmission gear 24 against the slider plate 52 (the direction of arrow R2 and the opposite direction to arrow R2). That is, the protrusion direction base end side S1*d* of the engaging surface S1 of the restricting protrusion 24E is parallel with the engaged surface 52B of the slider plate 52. A protrusion direction base end side S2*d* of the surface S2 at the opposite side of the restricting protrusion 24E from the side thereof at which the slider plate 52 is disposed (a portion corresponding with the base end portion 24E*d* in the protrusion direction of the restricting protrusion 24E) is formed in a planar shape along the axis direction of the transmission gear 24 and the sliding direction of the transmission gear 24 against the slider plate 52 (the direction of arrow R2 and the opposite direction to arrow R2). A protrusion direction distal end side S1*e* of the engaging surface S1 of the restricting protrusion 24E (a portion corresponding with a distal end portion 24Ee in the protrusion direction of the restricting protrusion 24E) is formed as an angled face in a planar (tapering) shape that is angled toward the opposite side from the slider plate 52 in the protrusion direction of the restricting protrusion 24E. A protrusion direction distal end side S2e of the surface S2 at the opposite side of the restricting protrusion 24E from the slider plate 52 (a portion corresponding with the distal end portion 24Ee in the protrusion direction of the restricting protrusion 24E) is formed as an angled face in a planar (tapering) shape that is angled toward the side thereof at which the slider plate 52 is disposed in the protrusion direction of the restricting protrusion 24E. Thus, the protrusion direction base end side S1d of the engaging surface S1 of the restricting protrusion 24E is disposed closer to the engaged surface 52B of the slider plate 52 than the protrusion direction distal end side S1e of the engaging surface S1.

A "U"-shaped trench 24G, an inner periphery face of which is curved, is formed in the transmission gear main body portion 24D of the transmission gear 24 along the periphery of the restricting protrusion 24E. Therefore, a stress concentration coefficient at the base end side in the protrusion direction of the restricting protrusion 24E (i.e., at a boundary between the restricting protrusion 24E and the transmission gear main body portion 24D) is smaller than in a structure in which the trench 24G is not formed.

—Second Bending Strength Measure—

In a structure in which the second bending strength measure is applied, as shown in FIG. 9, the engaging surface S1 of each restricting protrusion 24E is formed in a shape that, from the protrusion direction base end side S1d to the protrusion direction distal end side S1e, curves to the opposite side from the side thereof at which the slider plate 52 is disposed. The surface S2 at the opposite side of the restricting protrusion 24E from the slider plate 52 is formed in a shape that, from the protrusion direction base end side S2d to the protrusion direction distal end side S2e, curves toward the side thereof at which the slider plate 52 is disposed. Thus, the protrusion direction base end side S1d of the engaging surface S1 of the restricting protrusion 24E is disposed closer to the engaged surface 52B of the slider plate 52 than the protrusion direction distal end side S1e of the engaging surface S1. Regions of the structure to which the second bending strength measure is applied that correspond with regions of the structure to which the first bending strength measure is applied that is described above are assigned the same reference symbols as the reference symbols used in the descriptions of the structure to which the first bending strength measure is applied.

—Third Bending Strength Measure—

In a structure in which the third bending strength measure is applied, as shown in FIG. 10, the engaging surface S1 of each restricting protrusion 24E is formed, from the protrusion direction base end side S1d to the protrusion direction distal end side S1e, as an angled face in a planar (tapering) shape that is angled to the opposite side from the side thereof at which the engaged surface 52B of the slider plate 52 is disposed. The surface S2 at the opposite side of the restricting protrusion 24E from the side thereof at which the slider plate 52 is disposed is formed, from the protrusion direction base end side S2d to the protrusion direction distal end side S2e, as an angled face in a planar (tapering) shape that is angled toward the side thereof at which the slider plate 52 is disposed. Regions of the structure to which the third bending strength measure is applied that correspond with regions of the structure to which the first bending strength measure is applied and the like described above are assigned the same reference symbols as the reference symbols used in the descriptions of the structure to which the first bending strength measure is applied and the like.

In a structure in which the first bending strength measure, second bending strength measure or third bending strength measure is applied as described above and each restricting protrusion 24E is formed in a tapering shape, the position of a point of application P of a force F in a contact area between the engaging surface S1 of the restricting protrusion 24E and the engaged surface 52B of the slider plate 52 (or a position of a concentrated load substituting for a uniformly distributed load) may be shifted toward the protrusion direction base end side of the restricting protrusion 24E in comparison with a structure in which the restricting protrusion 24E is not formed in a tapering shape. As a result, bending stress at the base end side of the restricting protrusion 24E (at the boundary between the restricting protrusion 24E and the transmission gear main body portion 24D) may be reduced effectively.

=Fourth Bending Strength Measure, Fifth Bending Strength Measure and Sixth Bending Strength Measure=

Figure 11:
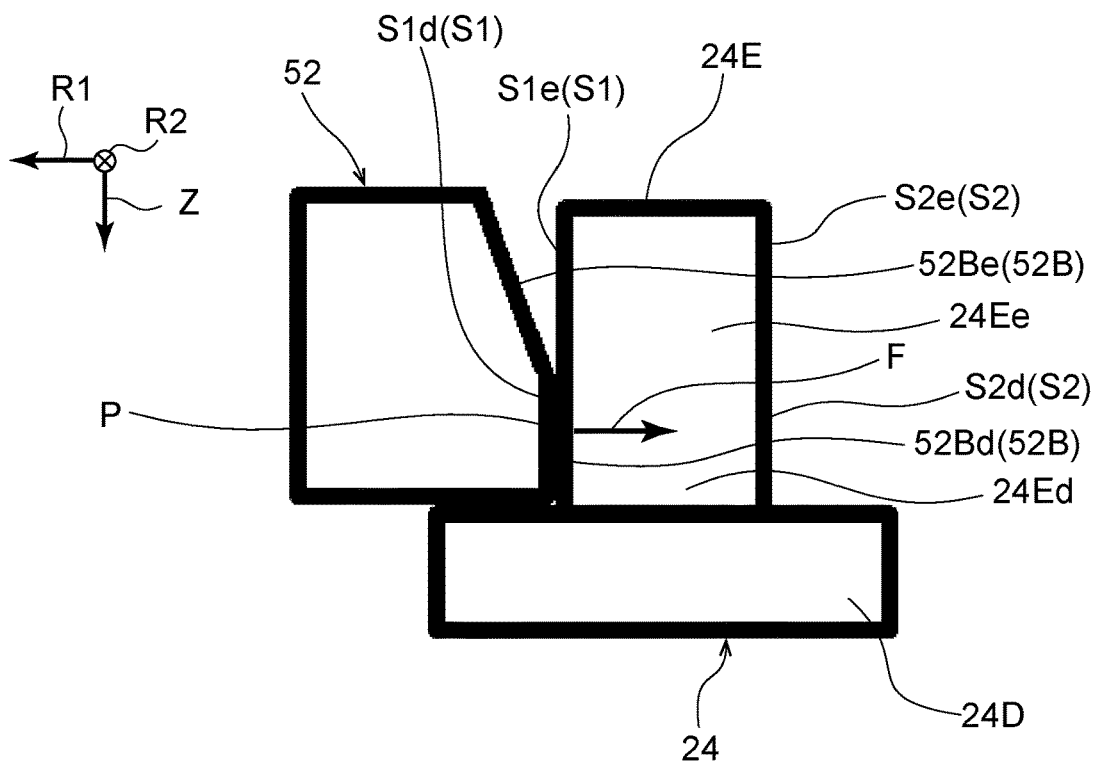
FIG. 11 is a side view schematically showing an engaging portion between an engaging protrusion portion of a transmission gear and a slider plate, to which a fourth bending strength measure is applied.
Figure 12:
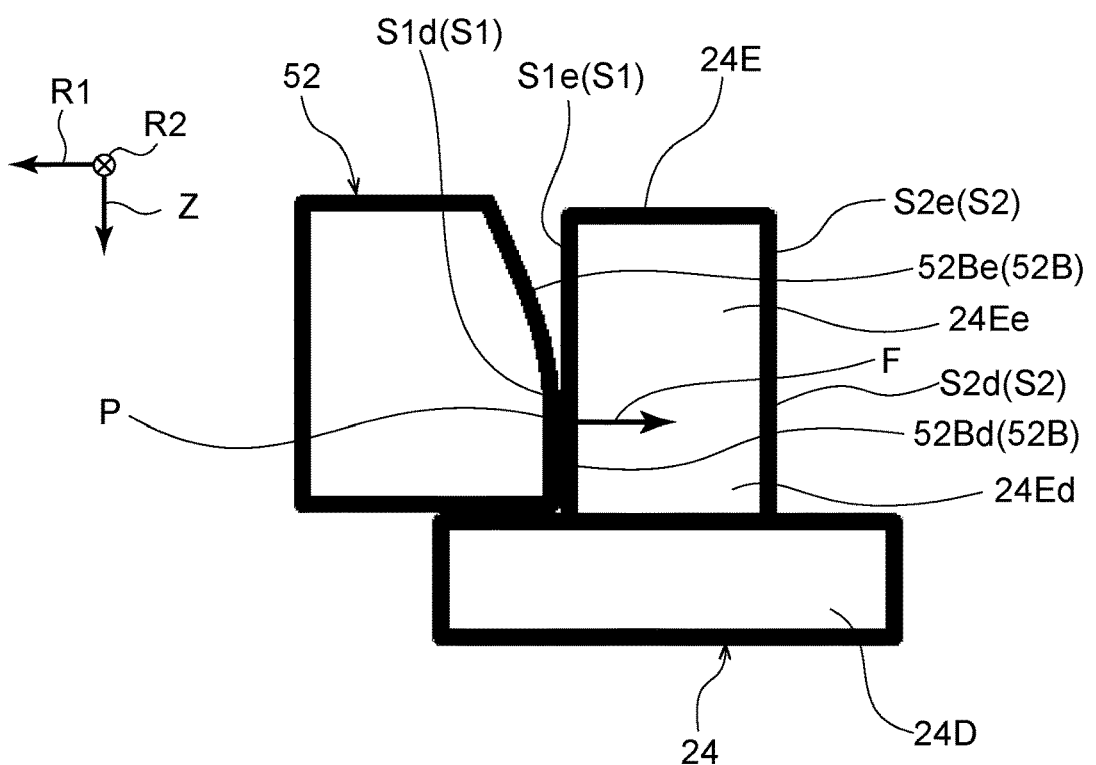
FIG. 12 is a side view schematically showing an engaging portion between an engaging protrusion portion of a transmission gear and a slider plate, to which a fifth bending strength measure is applied.
Figure 13:
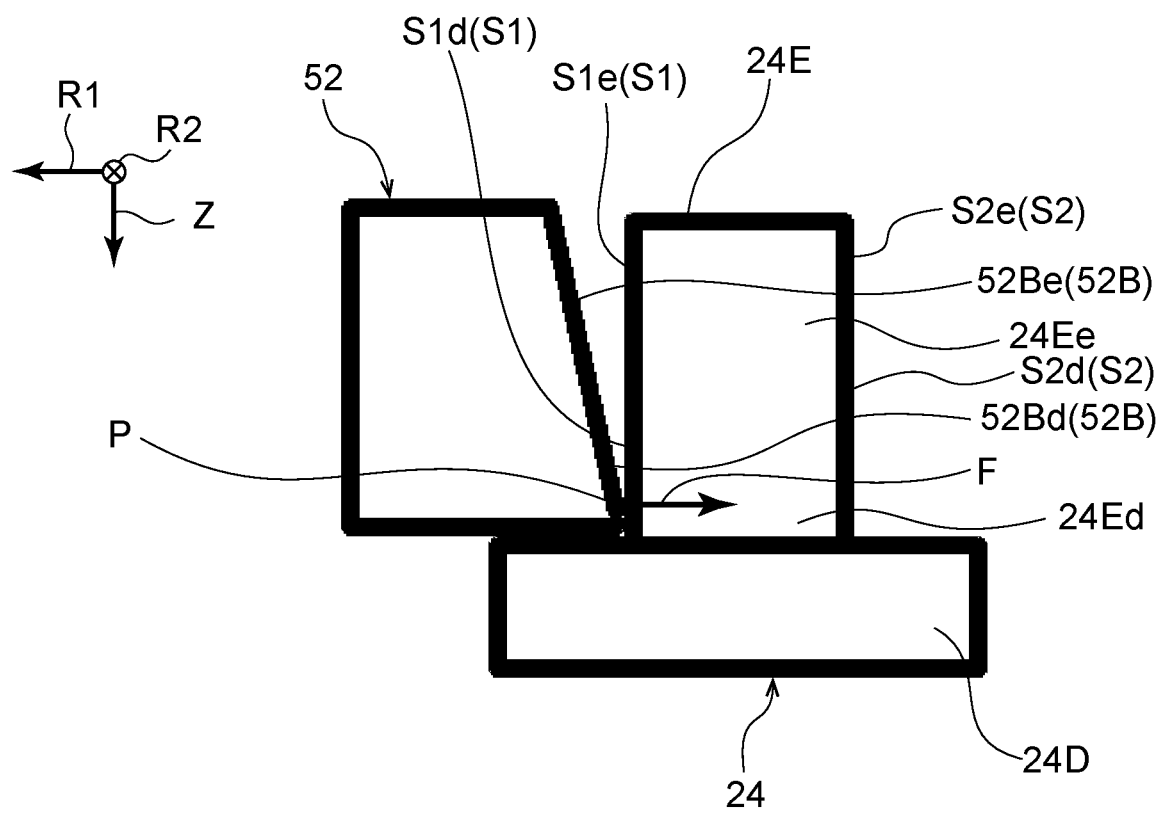
FIG. 13 is a side view schematically showing an engaging portion between an engaging protrusion portion of a transmission gear and a slider plate, to which a sixth bending strength measure is applied.

According to a fourth bending strength measure, a fifth bending strength measure and a sixth bending strength measure, which are illustrated in FIG. 11, FIG. 12 and FIG. 13, the structures of the restricting protrusions 24E according to the first bending strength measure, second bending strength measure and third bending strength measure that are described above are applied to the slider plate 52 side in order to reduce bending stresses produced in the restricting protrusions 24E. Members and portions that are not specifically described in the following descriptions have the same structures as in the speed reducer-equipped motor 10 described above.

—Fourth Bending Strength Measure—

To be specific, in a structure in which the fourth bending strength measure is applied, as shown in FIG. 11, a region 52Bd of each engaged surface 52B of the slider plate 52 that corresponds with the base end portion 24Ed of the restricting protrusion 24E is formed in a planar shape along the axis direction of the transmission gear 24 and the direction of sliding of the transmission gear 24 against the slider plate 52 (the direction of arrow R2 and the opposite direction to arrow R2). That is, the region 52Bd of the engaged surface 52B of the slider plate 52 that corresponds with the base end portion 24Ed of the restricting protrusion 24E is parallel with the engaging surface S1 of the restricting protrusion 24E. A region 52Be of the engaged surface 52B of the slider plate 52 that corresponds with the distal end portion 24Ee of the restricting protrusion 24E is formed as an angled face in a planar (tapering) shape that is angled toward the opposite side from the restricting protrusion 24E in the protrusion direction of the restricting protrusion 24E. Thus, the protrusion direction base end side S1d of the engaging surface S1 of the restricting protrusion 24E is disposed closer to the engaged surface 52B of the slider plate 52 than the protrusion direction distal end side S1e of the engaging surface S1. Regions of the structure to which the fourth bending strength measure is applied that correspond with regions of the structure to which the first bending strength measure is applied and the like described above are assigned the same reference symbols as the reference symbols used in the descriptions of the structure to which the first bending strength measure is applied and the like.

—Fifth Bending Strength Measure—

In a structure in which the fifth bending strength measure is applied, as shown in FIG. 12, each engaged surface 52B of the slider plate 52 is formed in a shape that curves to the opposite side from the side thereof at which the engaging surface S1 of the restricting protrusion 24E is disposed in the protrusion direction of the restricting protrusion 24E. Thus, the protrusion direction base end side S1*d* of the engaging surface S1 of the restricting protrusion 24E is disposed closer to the engaged surface 52B of the slider plate 52 than the protrusion direction distal end side S1*e* of the engaging surface S1. Regions of the structure to which the fifth bending strength measure is applied that correspond with regions of the structure to which the first bending strength measure is applied and the like described above are assigned the same reference symbols as the reference symbols used in the descriptions of the structure to which the first bending strength measure is applied and the like.

—Sixth Bending Strength Measure—

In a structure in which the sixth bending strength measure is applied, as shown in FIG. 13, each engaged surface 52B of the slider plate 52 is formed as an angled face in a planar (tapering) shape that is angled to the opposite side from the side thereof at which the engaging surface S1 of the restricting protrusion 24E is disposed in the protrusion direction of the restricting protrusion 24E. Thus, the protrusion direction base end side S1*d* of the engaging surface S1 of the restricting protrusion 24E is disposed closer to the engaged surface 52B of the slider plate 52 than the protrusion direction distal end side S1*e* of the engaging surface S1. Regions of the structure to which the sixth bending strength measure is applied that correspond with regions of the structure to which the first bending strength measure is applied and the like described above are assigned the same reference symbols as the reference symbols used in the descriptions of the structure to which the first bending strength measure is applied and the like.

In a structure in which the fourth bending strength measure, fifth bending strength measure or sixth bending strength measure is applied as described above, the position of a point of application P of a force F in a contact area between the engaging surface S1 of each restricting protrusion 24E and the engaged surface 52B of the slider plate 52 (or a position of a concentrated load substituting for a uniformly distributed load) may be shifted toward the protrusion direction base end side of the restricting protrusion 24E in comparison with a structure in which the engaged surface 52B of the slider plate 52 is formed as a flat surface along the axis direction of the transmission gear 24 and the direction of sliding of the transmission gear 24 against the slider plate 52 (the direction of arrow R2 and the opposite direction to arrow R2). As a result, bending stress at the base end side of the restricting protrusion 24E (at the boundary between the restricting protrusion 24E and the transmission gear main body portion 24D) may be reduced effectively.

The structures according to the first to sixth bending strength measures may be combined with one another.

Figure 14:
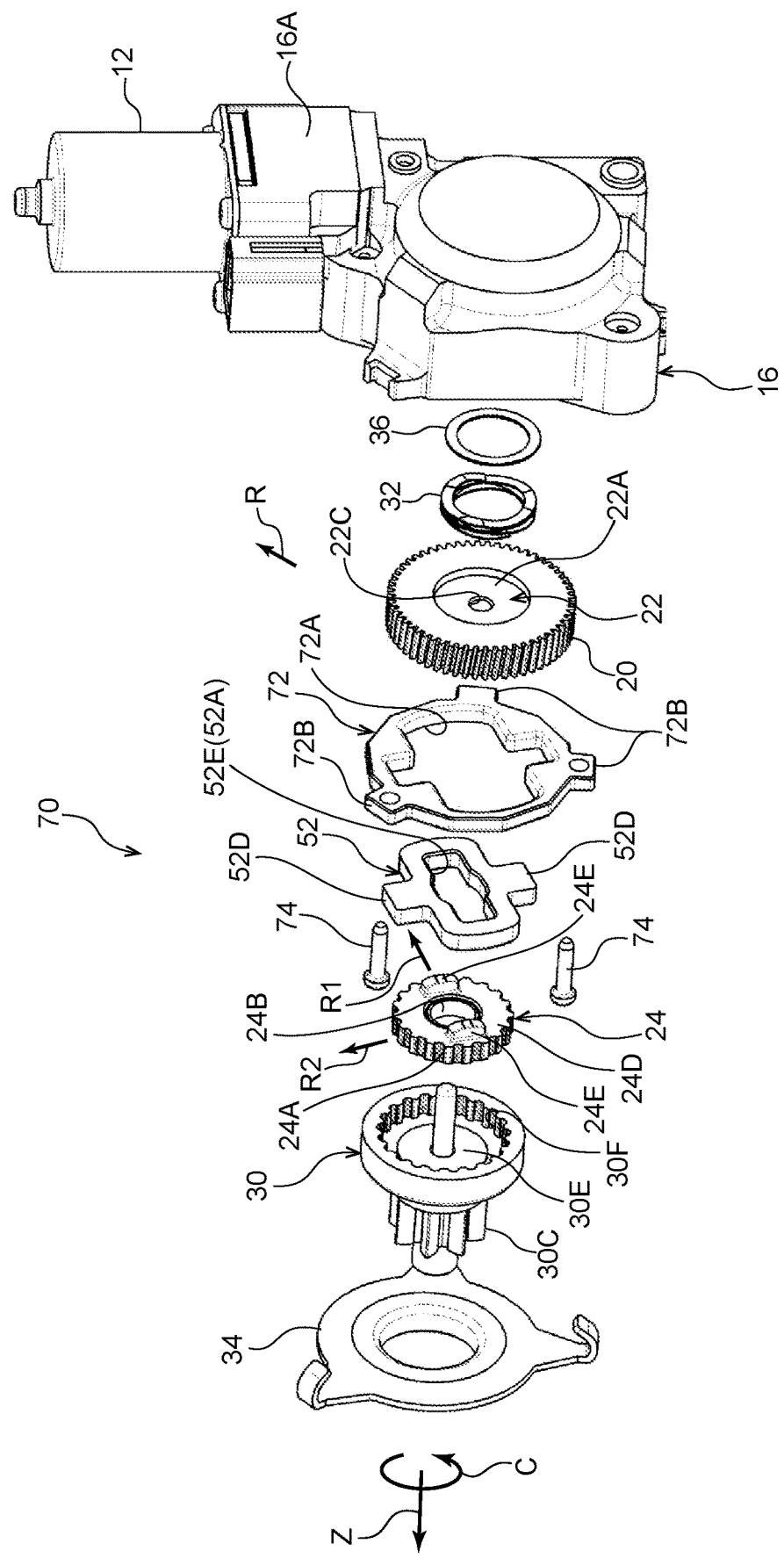
FIG. 14 is an exploded perspective view showing disassembly of a speed reducer-equipped motor according to an alternative exemplary embodiment.
Figure 15:
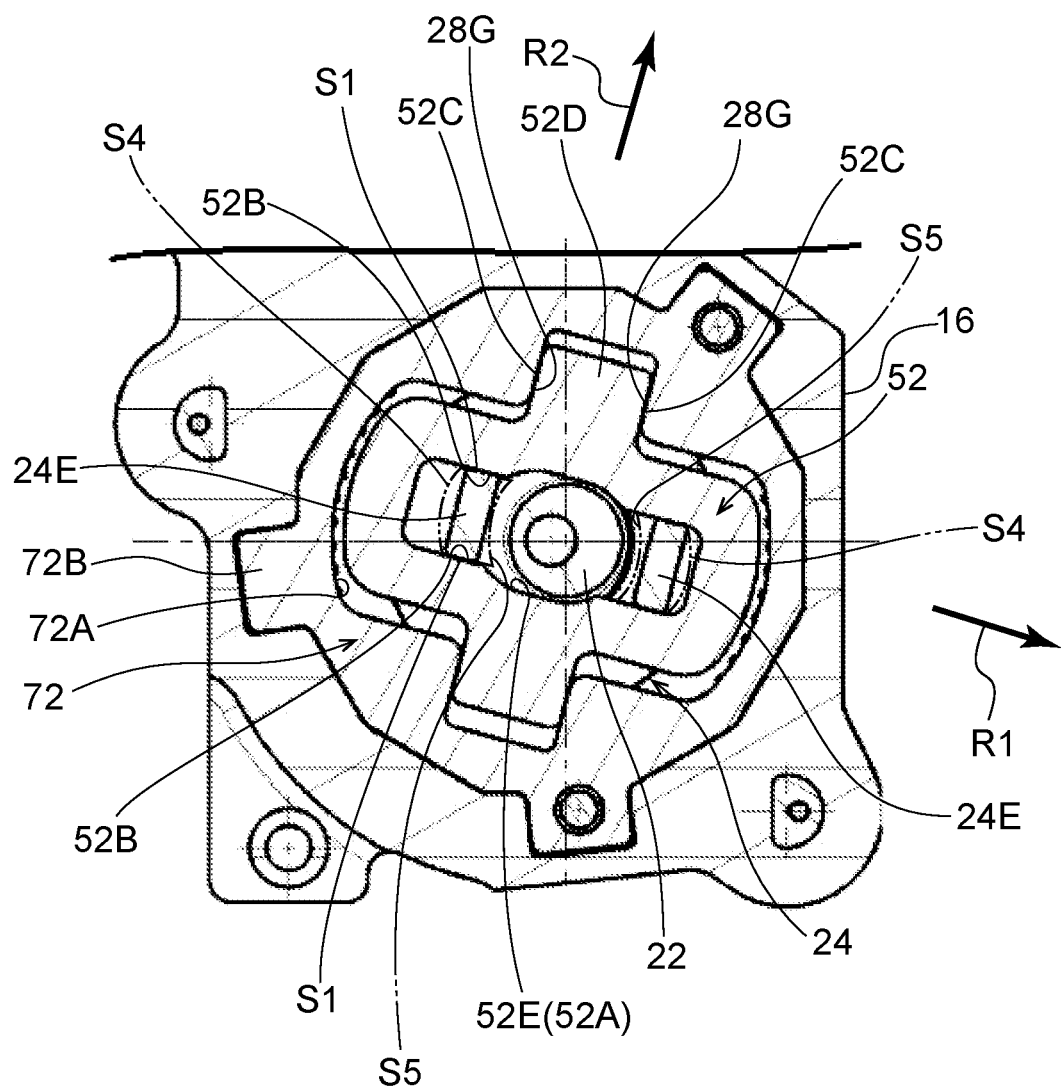
FIG. 15 is a plan sectional view showing a section of the speed reducer-equipped motor according to the alternative exemplary embodiment shown in FIG. 14, cut across engaging regions between a pair of restricting protrusion portions of a transmission gear and a slider plate.

The structures according to the first strength measure, second strength measure and third strength measure and structures according to the first to sixth bending strength measures that are described above are not just to be employed in configurations in which the slider plate 52 is disposed between the pair of restricting protrusions 24E of the transmission gear 24 (or the transmission gear 60, 62 or 64) but may be employed in alternative configurations. For example, as illustrated in FIG. 14 and FIG. 15, these structures may be employed in a configuration in which the pair of restricting protrusions 24E of the transmission gear 24 are disposed at the inside of the slider plate 52. Below, structures of a speed reducer-equipped motor 70 in which the pair of restricting protrusions 24E of the transmission gear 24 are disposed inside the slider plate 52 are described. Members and portions of the speed reducer-equipped motor 70 that correspond with the speed reducer-equipped motor 10 described above are assigned the same reference symbols as the corresponding members and portions of the speed reducer-equipped motor 10 and are not described here.

As shown in FIG. 14 and FIG. 15, the slider plate 52 that constitutes a portion of the speed reducer-equipped motor 70 is formed using a plate fabricated of metal. This slider plate 52 is provided with two locking protrusion portions 52D that protrude to diametric direction outer sides. A restricting hole 52E is formed at a central portion of the slider plate 52. Edge portions of the restricting hole 52E are formed in a rectangular shape as seen in the axis direction, and the pair of restricting protrusions 24E of the transmission gear 24 are disposed inside the restricting hole 52E.

A retention plate 72 that retains the slider plate 52 is formed using a plate fabricated of metal, similarly to the slider plate 52. A slider plate guide hole 72A is formed at a central portion of the retention plate 72. The slider plate 52 is disposed in the slider plate guide hole 72A. Because the slider plate 52 is disposed in the slider plate guide hole 72A, the slider plate 52 is supported to be slidable relative to the retention plate 72. Three fixing protrusion portions 72B are formed at outer periphery portions of the retention plate 72. The fixing protrusion portions 72B engage with the housing 16. Screw insertion holes, in which screws 74 are inserted, are formed in two of the three fixing protrusion portions 72B. The retention plate 72 is fixed to the housing 16 by the screws 74 inserted into the screw insertion holes being screwed into the housing 16.

As illustrated by the two-dot chain lines in FIG. 15, the projected area of each of the pair of restricting protrusions 24E of the transmission gear 24 may be increased by forming a surface of the restricting protrusion 24E other than an engaging surface S1 in a convex shape. Therefore, strengths of the restricting protrusions 24E may be assured. More specifically, seen in the axis direction of the transmission gear 24, a surface S4 at the opposite side of each restricting protrusion 24E from the side thereof at which the eccentric shaft 22 is disposed is curved in a cylinder surface shape so as to protrude to the radial direction outer side. Meanwhile, seen in the axis direction of the transmission gear 24, surfaces S5 at the sides of the restricting protrusions 24E at which the eccentric shaft 22 is disposed are curved in circular tube surface shapes so as to be recessed to radial direction inner sides (such that sides thereof at which two of the engaging surfaces S1 are disposed are convex shapes).

Structures according to the first to third bending strength measures described above may be employed at the sides of the pair of restricting protrusions 24E of the transmission gear 24 at which the engaging surfaces S1 are formed. Structures according to the fourth to sixth bending strength measures described above may be applied to the sides of the slider plate 52 at which the engaged surfaces 52B are formed.

=Structures for Suppressing Irregularity of Movements of the Transmission Gear 24=

When contact pressure between the transmission gear 24 and the slider plate 52 that restricts spinning of the transmission gear 24 increases and contacting portions of the transmission gear 24 and the slider plate 52 plastically deform, looseness between the transmission gear 24 and the slider plate 52 is likely to become greater. Furthermore, when contact pressure between the slider plate 52 and the fixed gear 28 that supports the slider plate 52 increases and contacting portions of the slider plate 52 and the fixed gear 28 plastically deform, looseness between the slider plate 52 and the fixed gear 28 is likely to become greater. In these circumstances, movements of the transmission gear 24 can be expected to become irregular. Below, structures to which measures for suppressing irregularity of movements of the transmission gear 24 are applied are described.

—First Measure—

Figure 16:
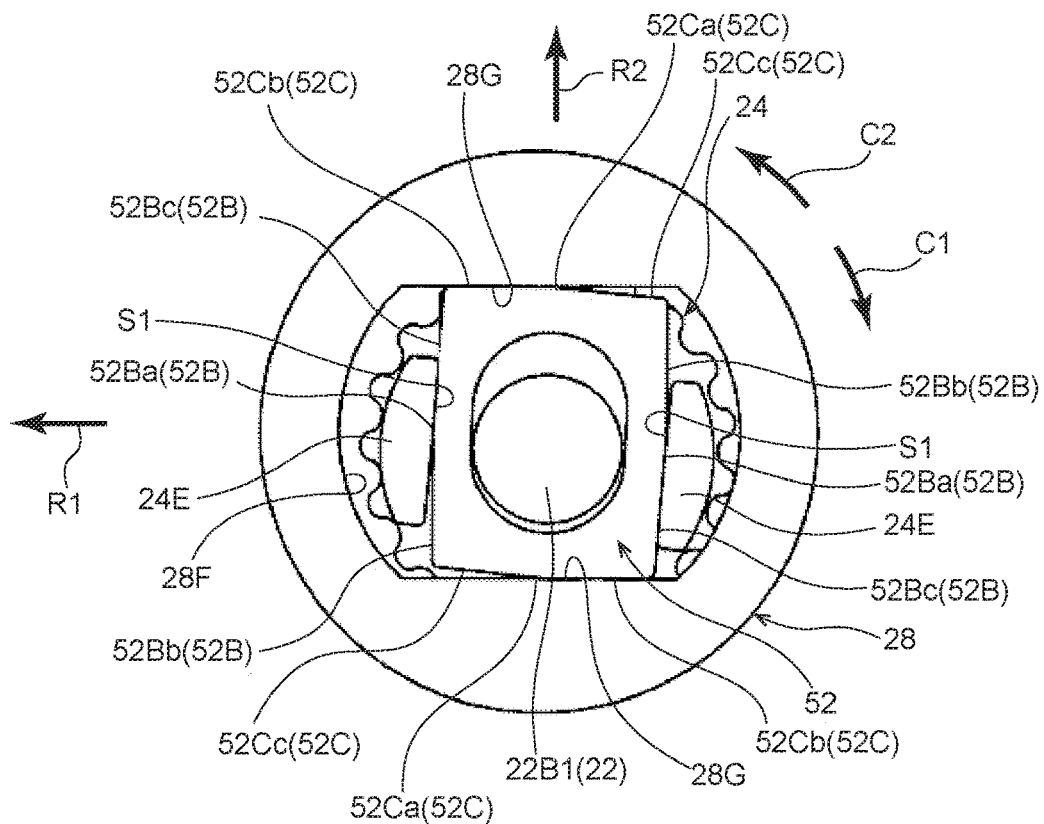
FIG. 16 is an elevation view showing engaging portions between a slider plate and transmission gear to which a first measure is applied, and engaging portions between the slider plate and a fixed gear.
Figure 17:
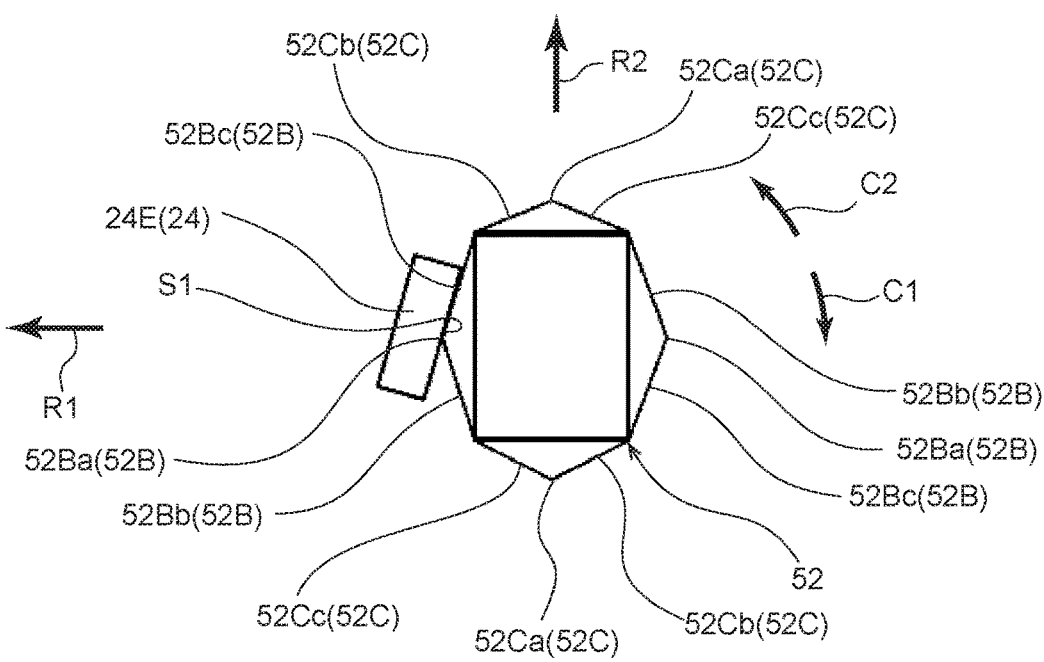
FIG. 17 is an elevation view schematically showing an engaging portion between the slider plate and transmission gear to which the first measure is applied.

FIG. 16 and FIG. 17 show engaging portions between the slider plate 52, to which a first measure is applied, and the transmission gear 24, and engaging portions between the slider plate 52 and the fixed gear 28. According to the present measure as shown in these drawings, the pair of first slider surfaces 52C of the slider plate 52 are formed in convex shapes towards the respective sides thereof at which the pair of second slider surfaces 28G of the fixed gear 28 are disposed as seen in the axis direction of the transmission gear 24. In addition, the pair of engaged surfaces 52B of the slider plate 52 are formed in convex shapes towards the respective sides thereof at which the engaging surfaces S1 of the pair of restricting protrusions 24E of the transmission gear 24 are disposed as seen in the axis direction of the transmission gear 24. In FIG. 17, the protruding shapes of these surfaces that are formed in convex shapes are depicted more exaggeratedly than in FIG. 16. Members and portions that are not specifically described in the following descriptions have the same structures as in the speed reducer-equipped motor 10 described above.

More specifically, an inflection portion 52Ca is formed at the center of each first slider surface 52C of the slider plate 52 in the direction of sliding of the slider plate 52 (the direction of arrow R1 and the opposite direction to arrow R1). The inflection portion 52Ca is a protrusion toward the second slider surface 28G side of the fixed gear 28 as seen in the axis direction of the transmission gear 24. The two sides of the inflection portion 52Ca of the first slider surface 52C of the slider plate 52 are formed as a first angled face 52Cb and a second angled face 52Cc, which are formed in planar shapes and are gently angled to one side and the other side (the direction of arrow R2 and the opposite direction to arrow R2) of the direction of sliding of the transmission gear 24 against the slider plate 52.

Meanwhile, an inflection portion 52Ba is formed at the center of each engaged surface 52B of the slider plate 52 in the direction of sliding of the transmission gear 24 against the slider plate 52 (the direction of arrow R2 and the opposite direction to arrow R2). The inflection portion 52Ba is a protrusion toward the engaging surface S1 side of the restricting protrusion 24E of the transmission gear 24 as seen in the axis direction of the transmission gear 24. The two sides of the inflection portion 52Ba of the engaged surface 52B of the slider plate 52 are formed as a first angled face 52Bb and a second angled face 52Bc, which are formed in planar shapes and are gently angled to one side and the other side (the direction of arrow R1 and the opposite direction to arrow R1) of the direction of sliding of the slider plate 52.

In the structure to which the first measure is applied that is described above, when the transmission gear 24 revolves to one side (in the direction of arrow C1) due to the rotary shaft 12A of the motor 12 (see FIG. 1) rotating to one side, the transmission gear 24 and the slider plate 52 tilt in the direction of arrow C1 by an amount corresponding to clearances between the pair of restricting protrusions 24E of the transmission gear 24 and the slider plate 52 and clearances between the slider plate 52 and the fixed gear 28. As a result, the engaging surface S1 of each restricting protrusion 24E of the transmission gear 24 touches the engaged surface 52B of the slider plate 52 at the side at which the second angled face 52Bc is formed, and the side of each first slider surface 52C of the slider plate 52 at which the first angled face 52Cb is formed touches the second slider surface 28G of the fixed gear 28. Therefore, when the transmission gear 24 and the slider plate 52 tilt in the direction of arrow C1, a contact area between the engaging surface S1 of each restricting protrusion 24E of the transmission gear 24 and the engaged surface 52B of the slider plate 52 may be increased and a contact area between each first slider surface 52C of the slider plate 52 and the second slider surface 28G of the fixed gear 28 may be increased (changing from line contact states to area contact states) compared to a structure in which the engaged surfaces 52B and first slider surfaces 52C of the slider plate 52 are formed in simple planar shapes. Consequently, plastic deformation of contacting portions between the engaging surfaces S1 of the restricting protrusions 24E of the transmission gear 24 and the engaged surfaces 52B of the slider plate 52 and of contacting portions between the first slider surfaces 52C of the slider plate 52 and the second slider surfaces 28G of the fixed gear 28 may be suppressed. Therefore, clearances between the pair of restricting protrusions 24E of the transmission gear 24 and the slider plate 52 and clearances between the slider plate 52 and the fixed gear 28 may be maintained, and irregularity of movements of the transmission gear 24 may be suppressed. When the transmission gear 24 revolves to the other side (in the direction of arrow C2) due to the rotary shaft 12A of the motor 12 (see FIG. 1) rotating to the other side, the engaging surface S1 of each restricting protrusion 24E of the transmission gear 24 touches the engaged surface 52B of the slider plate 52 at the side thereof at which the first angled face 52Bb is formed, and the side of each first slider surface 52C of the slider plate 52 at which the second angled face 52Cc is formed touches the second slider surface 28G of the fixed gear 28.

—Second Measure—

Figure 18:
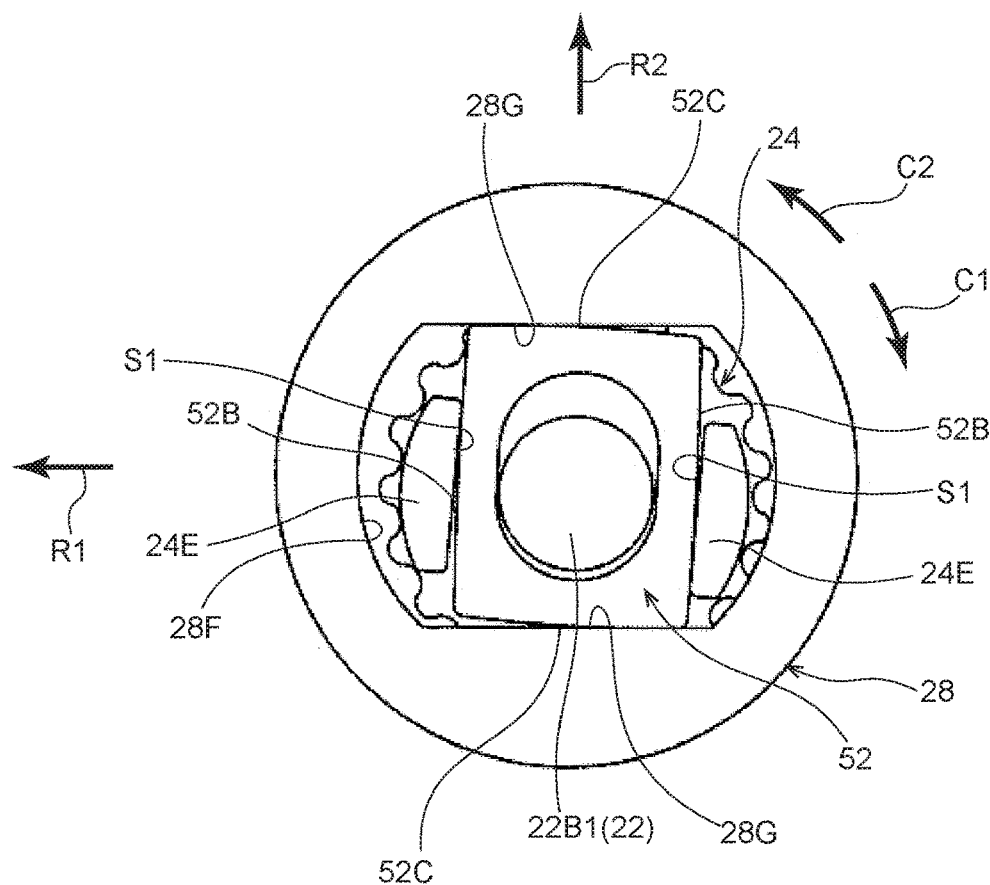
FIG. 18 is an elevation view showing engaging portions between a slider plate and transmission gear to which a second measure is applied, and engaging portions between the slider plate and the fixed gear.
Figure 19:
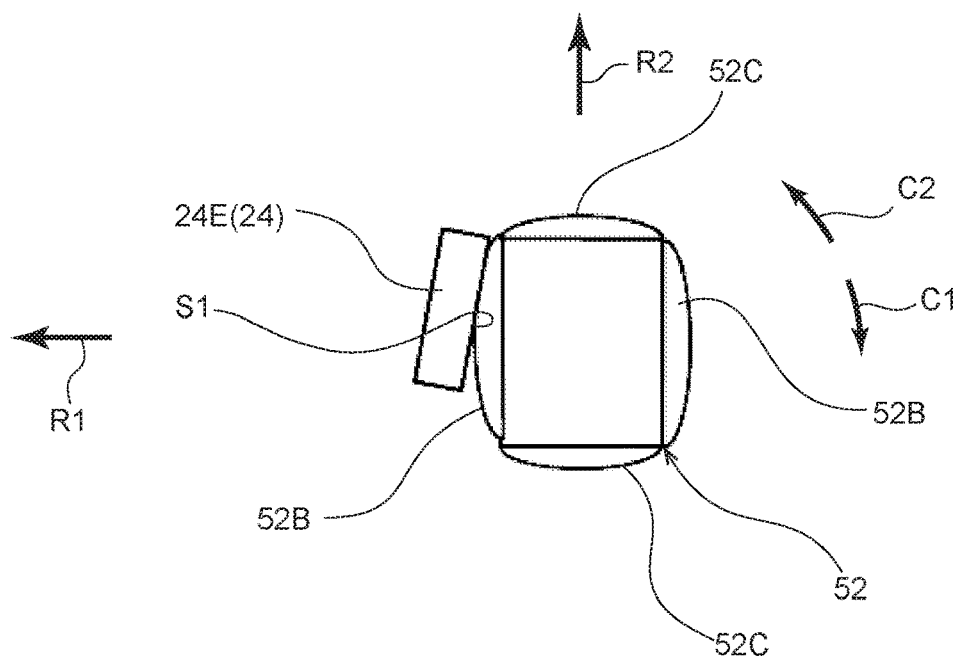
FIG. 19 is an elevation view schematically showing an engaging portion between the slider plate and transmission gear to which the second measure is applied.

FIG. 18 and FIG. 19 show engaging portions between the slider plate 52, to which a second measure is applied, and the transmission gear 24, and engaging portions between the slider plate 52 and the fixed gear 28. As shown in these drawings, according to the present measure, the pair of first slider surfaces 52C of the slider plate 52 are formed in convex shapes towards the respective sides thereof at which the pair of second slider surfaces 28G of the fixed gear 28 are disposed as seen in the axis direction of the transmission gear 24. In addition, the pair of engaged surfaces 52B of the slider plate 52 are formed in convex shapes towards the respective sides thereof at which the engaging surfaces S1 of the pair of restricting protrusions 24E of the transmission gear 24 are disposed as seen in the axis direction of the transmission gear 24. In FIG. 18, the protruding shapes of these surfaces that are formed in convex shapes are depicted more exaggeratedly than in FIG. 19. Members and portions that are not specifically described in the following descriptions have the same structures as in the speed reducer-equipped motor 10 described above.

More specifically, each first slider surface 52C of the slider plate 52 is gently curved in a cylinder surface shape such that a region thereof that protrudes furthest is at the center in the direction of sliding of the slider plate 52 (the direction of arrow R1 and the opposite direction to arrow R1).

Meanwhile, each engaged surface 52B of the slider plate 52 is gently curved in a cylinder surface shape such that a region thereof that protrudes furthest is at the center in the direction of sliding of the transmission gear 24 against the slider plate 52 (the direction of arrow R2 and the opposite direction to arrow R2).

In the structure to which the second measure is applied that is described above, when the transmission gear 24 revolves to the one side thereof (in the direction of arrow C1) due to the rotary shaft 12A of the motor 12 (see FIG. 1) rotating to the one side thereof, the transmission gear 24 and the slider plate 52 tilt in the direction of arrow C1 by an amount corresponding to clearances between the pair of restricting protrusions 24E of the transmission gear 24 and the slider plate 52 and clearances between the slider plate 52 and the fixed gear 28. As a result, the engaging surface S1 of each restricting protrusion 24E of the transmission gear 24 touches the engaged surface 52B of the slider plate 52 at the side thereof in the direction of arrow C1, and the side in the direction of arrow C2 of each first slider surface 52C of the slider plate 52 touches the second slider surface 28G of the fixed gear 28. Therefore, when the transmission gear 24 and the slider plate 52 tilt in the direction of arrow C1, a contact area between the engaging surface S1 of each restricting protrusion 24E of the transmission gear 24 and the engaged surface 52B of the slider plate 52 may be increased and a contact area between each first slider surface 52C of the slider plate 52 and the second slider surface 28G of the fixed gear 28 may be increased (changing from line contact states to area contact states) compared to a structure in which the engaged surfaces 52B and first slider surfaces 52C of the slider plate 52 are formed in simple planar shapes. Consequently, plastic deformation of contacting portions between the engaging surfaces S1 of the restricting protrusions 24E of the transmission gear 24 and the engaged surfaces 52B of the slider plate 52 and of contacting portions between the first slider surfaces 52C of the slider plate 52 and the second slider surfaces 28G of the fixed gear 28 may be suppressed. Therefore, clearances between the pair of restricting protrusions 24E of the transmission gear 24 and the slider plate 52 and clearances between the slider plate 52 and the fixed gear 28 may be maintained, and irregularity of movements of the transmission gear 24 may be suppressed. When the transmission gear 24 revolves to the other side (in the direction of arrow C2) due to the rotary shaft 12A of the motor 12 (see FIG. 1) rotating to the other side, the engaging surface S1 of each restricting protrusion 24E of the transmission gear 24 touches the engaged surface 52B of the slider plate 52 at the side thereof in the direction of arrow C2, and the side in the direction of arrow C1 of each first slider surface 52C of the slider plate 52 touches the second slider surface 28G of the fixed gear 28.

—Third Measure—

Figure 20:
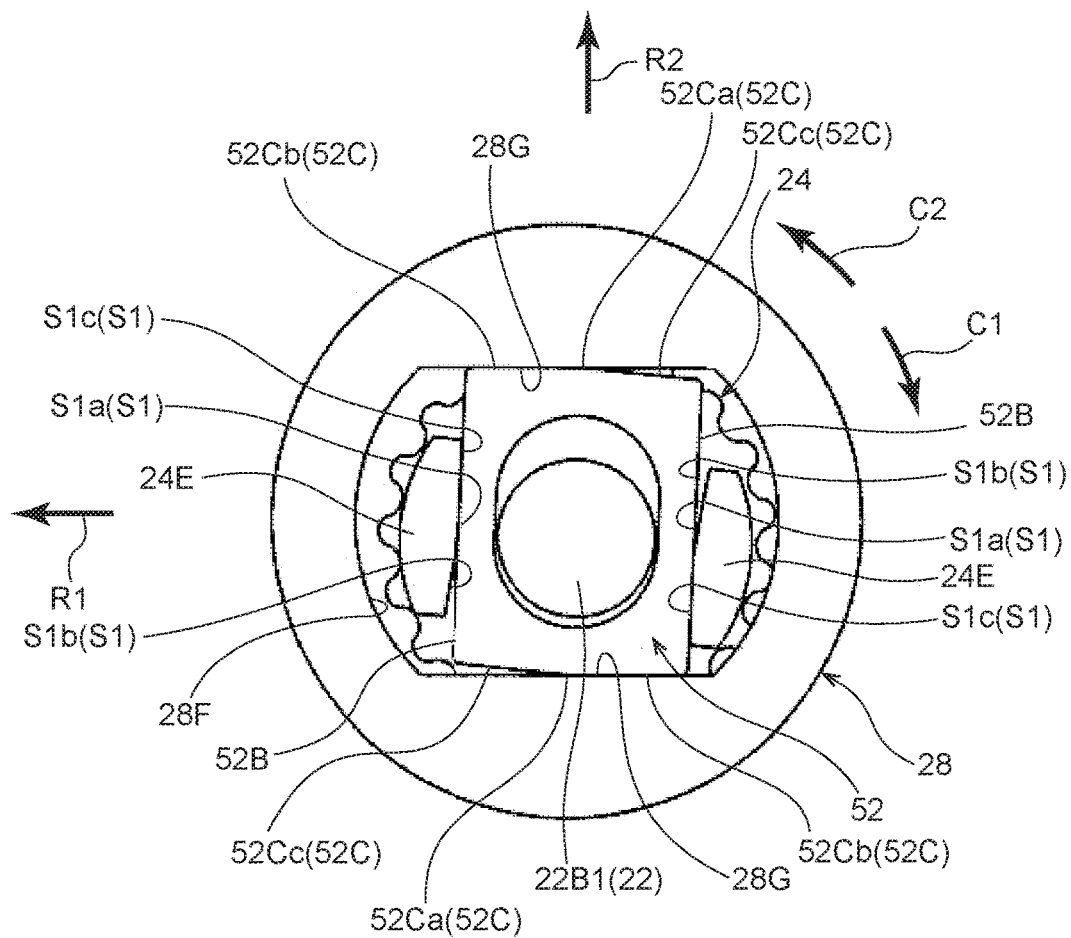
FIG. 20 is an elevation view showing engaging portions between a slider plate and transmission gear to which a third measure is applied, and engaging portions between the slider plate and the fixed gear.
Figure 21:
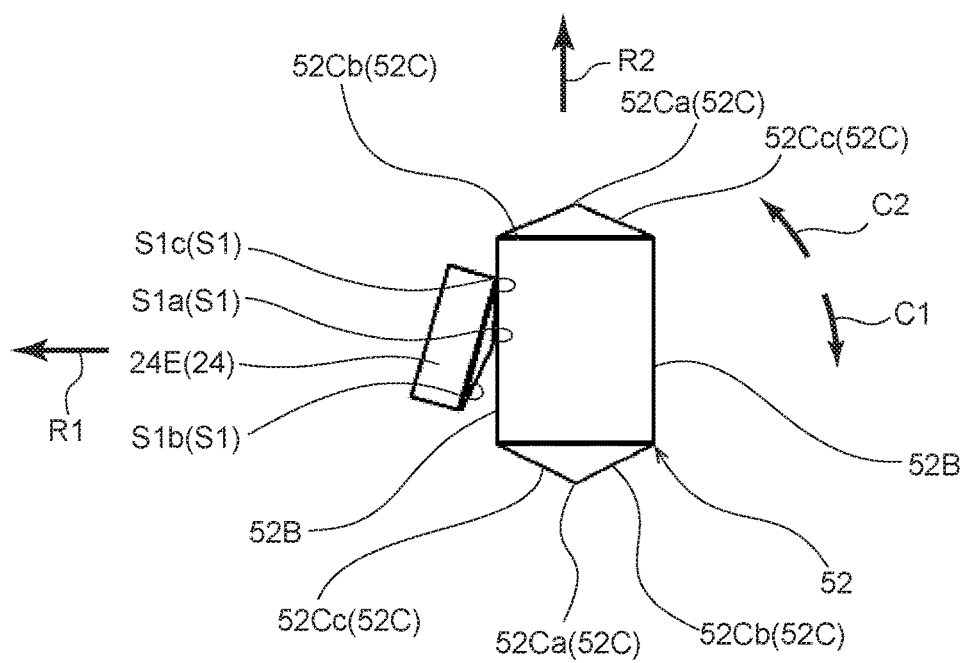
FIG. 21 is an elevation view schematically showing an engaging portion between the slider plate and transmission gear to which the third measure is applied.

FIG. 20 and FIG. 21 show engaging portions between the slider plate 52, to which a third measure is applied, and the transmission gear 24, and engaging portions between the slider plate 52 and the fixed gear 28. As shown in these drawings, according to the present measure, the pair of first slider surfaces 52C of the slider plate 52 are formed in convex shapes towards the respective sides thereof at which the pair of second slider surfaces 28G of the fixed gear 28 are disposed as seen in the axis direction of the transmission gear 24. In addition, the engaging surfaces S1 of the pair of restricting protrusions 24E of the transmission gear 24 are formed in convex shapes towards the respective sides thereof at which the pair of engaged surfaces 52B of the slider plate 52 are disposed as seen in the axis direction of the transmission gear 24. In FIG. 21, the protruding shapes of these surfaces that are formed in convex shapes are depicted more exaggeratedly than in FIG. 20. Members and portions that are not specifically described in the following descriptions have the same structures as in the speed reducer-equipped motor 10 described above.

Structures of the first slider surfaces 52C of the slider plate 52 according to the third measure are the same as the structures of the first slider surfaces 52C according to the first measure described above. Accordingly, the same reference symbols are applied to the first slider surfaces 52C of the slider plate 52 according to the third measure as to the portions of the first slider surfaces 52C according to the first measure described above.

Meanwhile, an inflection portion S1$a$ is formed at the center of the engaging surface S1 of each restricting protrusion 24E of the transmission gear 24 in the direction of sliding of the transmission gear 24 against the slider plate 52 (the direction of arrow R2 and the opposite direction to arrow R2). The inflection portion S1$a$ is a protrusion toward the side at which the engaged surface 52B of the slider plate 52 is disposed as seen in the axis direction of the transmission gear 24. The two sides of the inflection portion S1$a$ of the restricting protrusion 24E of the transmission gear 24 are formed as a first angled face S1$b$ and a second angled face S1$c$, which are formed in planar shapes and are gently angled to one side and the other side (the direction of arrow R1 and the opposite direction to arrow R1) of the direction of sliding of the slider plate 52.

In the structure to which the third measure is applied that is described above, when the transmission gear 24 revolves to the one side (in the direction of arrow C1) due to the rotary shaft 12A of the motor 12 (see FIG. 1) rotating to the one side, the transmission gear 24 and the slider plate 52 tilt in the direction of arrow C1 by an amount corresponding to clearances between the pair of restricting protrusions 24E of the transmission gear 24 and the slider plate 52 and clearances between the slider plate 52 and the fixed gear 28. As a result, the second angled face S1$c$ side of the engaging surface S1 of each restricting protrusion 24E of the transmission gear 24 touches the engaged surface 52B of the slider plate 52, and the side of each first slider surface 52C of the slider plate 52 at which the first angled face 52C$b$ is formed touches the second slider surface 28G of the fixed gear 28. Therefore, when the transmission gear 24 and the slider plate 52 tilt in the direction of arrow C1, a contact area between the engaging surface S1 of each restricting protrusion 24E of the transmission gear 24 and the engaged surface 52B of the slider plate 52 may be increased and a contact area between each first slider surface 52C of the slider plate 52 and the second slider surface 28G of the fixed gear 28 may be increased (changing from line contact states to area contact states) compared to a structure in which the engaging surfaces S1 of the restricting protrusions 24E of the transmission gear 24 and the first slider surfaces 52C of the slider plate 52 are formed in simple planar shapes. Consequently, plastic deformation of contacting portions between the engaging surfaces S1 of the restricting protrusions 24E of the transmission gear 24 and the engaged surfaces 52B of the slider plate 52 and of contacting portions between the first slider surfaces 52C of the slider plate 52 and the second slider surfaces 28G of the fixed gear 28 may be suppressed. Therefore, clearances between the pair of restricting protrusions 24E of the transmission gear 24 and the slider plate 52 and clearances between the slider plate 52 and the fixed gear 28 may be maintained, and irregularity of movements of the transmission gear 24 may be suppressed. When the transmission gear 24 revolves to the other side (in the direction of arrow C2) due to the rotary shaft 12A of the motor 12 (see FIG. 1) rotating to the other side, the engaging surface S1 of each restricting protrusion 24E of the transmission gear 24 at the side thereof at which the first angled face S1*b* is formed touches the engaged surface 52B of the slider plate 52, and the side of the first slider surface 52C of the slider plate 52 at which the second angled face 52Cc is formed touches the second slider surface 28G of the fixed gear 28.

—Fourth Measure—

Figure 22:
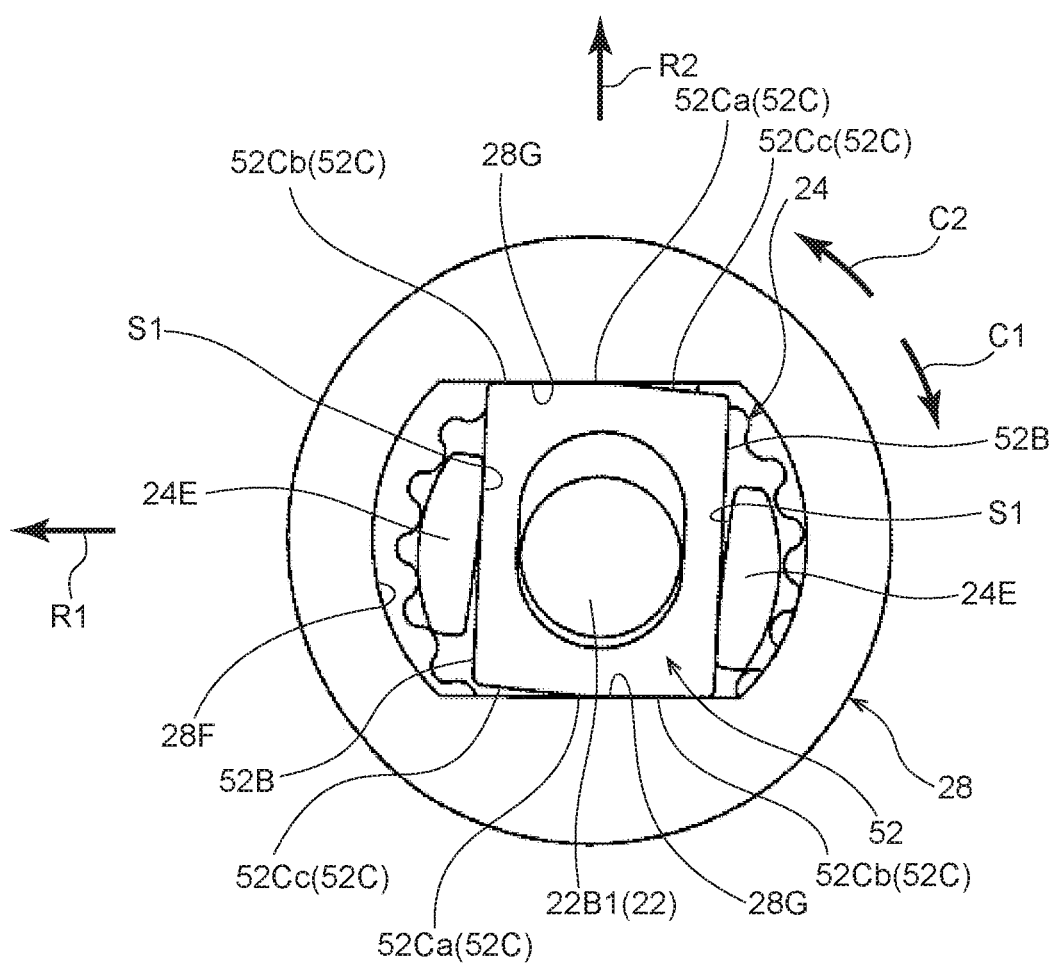
FIG. 22 is an elevation view showing engaging portions between a slider plate and transmission gear to which a fourth measure is applied, and engaging portions between the slider plate and the fixed gear.
Figure 23:
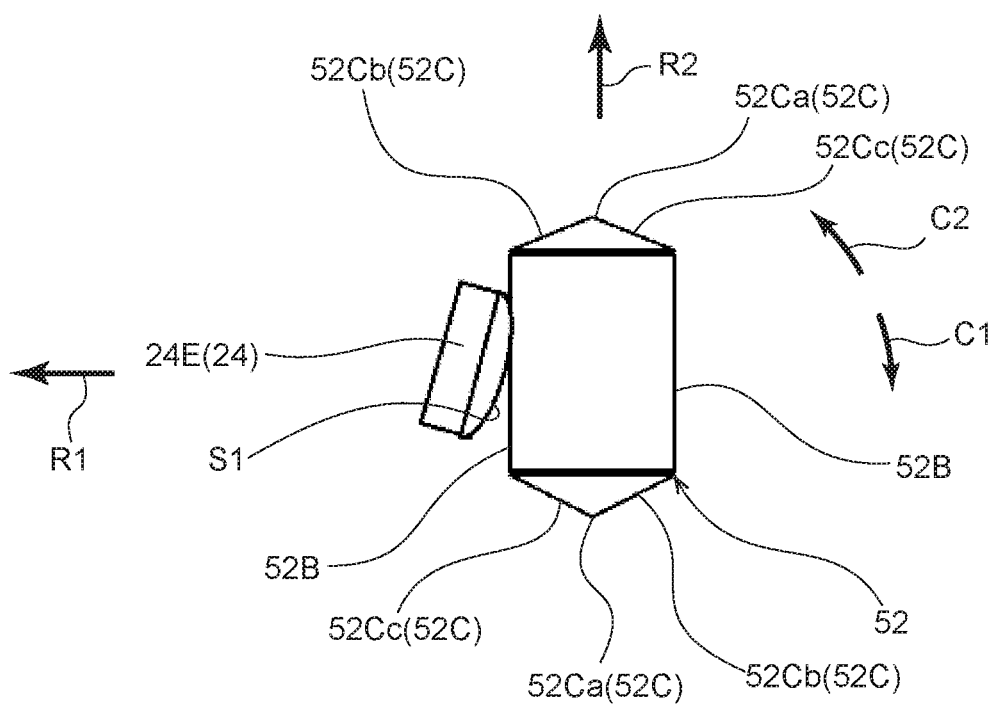
FIG. 23 is an elevation view schematically showing an engaging portion between the slider plate and transmission gear to which the fourth measure is applied.

FIG. 22 and FIG. 23 show engaging portions between the slider plate 52, to which a fourth measure is applied, and the transmission gear 24, and engaging portions between the slider plate 52 and the fixed gear 28. As shown in these drawings, according to the present measure, the pair of first slider surfaces 52C of the slider plate 52 are formed in convex shapes towards the respective sides thereof at which the pair of second slider surfaces 28G of the fixed gear 28 are disposed as seen in the axis direction of the transmission gear 24. In addition, the engaging surfaces S1 of the pair of restricting protrusions 24E of the transmission gear 24 are formed in convex shapes towards the respective sides thereof at which the pair of engaged surfaces 52B of the slider plate 52 are disposed as seen in the axis direction of the transmission gear 24. In FIG. 23, the protruding shapes of these surfaces that are formed in convex shapes are depicted more exaggeratedly than in FIG. 22. Members and portions that are not specifically described in the following descriptions have the same structures as in the speed reducer-equipped motor 10 described above.

Structures of the first slider surfaces 52C of the slider plate 52 according to the fourth measure are the same as the structures of the first slider surfaces 52C according to the first measure and third measure described above. Accordingly, the same reference symbols are applied to the first slider surfaces 52C of the slider plate 52 according to the fourth measure as to the portions of the first slider surfaces 52C according to the first measure and third measure described above.

Meanwhile, the engaging surface S1 of each restricting protrusion 24E of the transmission gear 24 is gently curved in a cylinder surface shape such that a region thereof that protrudes furthest is at the center in the direction of sliding of the transmission gear 24 against the slider plate 52 (the direction of arrow R2 and the opposite direction to arrow R2).

In the structure to which the fourth measure is applied that is described above, when the transmission gear 24 revolves to the one side (in the direction of arrow C1) due to the rotary shaft 12A of the motor 12 (see FIG. 1) rotating to the one side, the transmission gear 24 and the slider plate 52 tilt in the direction of arrow C1 by an amount corresponding to clearances between the pair of restricting protrusions 24E of the transmission gear 24 and the slider plate 52 and clearances between the slider plate 52 and the fixed gear 28. As a result, the engaging surface S1 of each restricting protrusion 24E of the transmission gear 24 at the side of arrow C1 touches the engaged surface 52B of the slider plate 52, and the side of the first slider surface 52C of the slider plate 52 at which the first angled face 52Cb is formed touches the second slider surface 28G of the fixed gear 28. Therefore, when the transmission gear 24 and the slider plate 52 tilt in the direction of arrow C1, a contact area between the engaging surface S1 of each restricting protrusion 24E of the transmission gear 24 and the engaged surface 52B of the slider plate 52 may be increased and a contact area between each first slider surface 52C of the slider plate 52 and the second slider surface 28G of the fixed gear 28 may be increased (changing from line contact states to area contact states) compared to a structure in which the engaging surfaces S1 of the restricting protrusions 24E of the transmission gear 24 and the first slider surfaces 52C of the slider plate 52 are formed in simple planar shapes. Consequently, plastic deformation of contacting portions between the engaging surfaces S1 of the restricting protrusions 24E of the transmission gear 24 and the engaged surfaces 52B of the slider plate 52 and of contacting portions between the first slider surfaces 52C of the slider plate 52 and the second slider surfaces 28G of the fixed gear 28 may be suppressed. Therefore, clearances between the pair of restricting protrusions 24E of the transmission gear 24 and the slider plate 52 and clearances between the slider plate 52 and the fixed gear 28 may be maintained, and irregularity of movements of the transmission gear 24 may be suppressed. When the transmission gear 24 revolves to the other side (in the direction of arrow C2) due to the rotary shaft 12A of the motor 12 (see FIG. 1) rotating to the other side, the engaging surface S1 of each restricting protrusion 24E of the transmission gear 24 at the side thereof in the direction of arrow C2 touches the engaged surface 52B of the slider plate 52, and the side of the first slider surface 52C of the slider plate 52 at which the second angled face 52Cc is formed touches the second slider surface 28G of the fixed gear 28.

Figure 24:
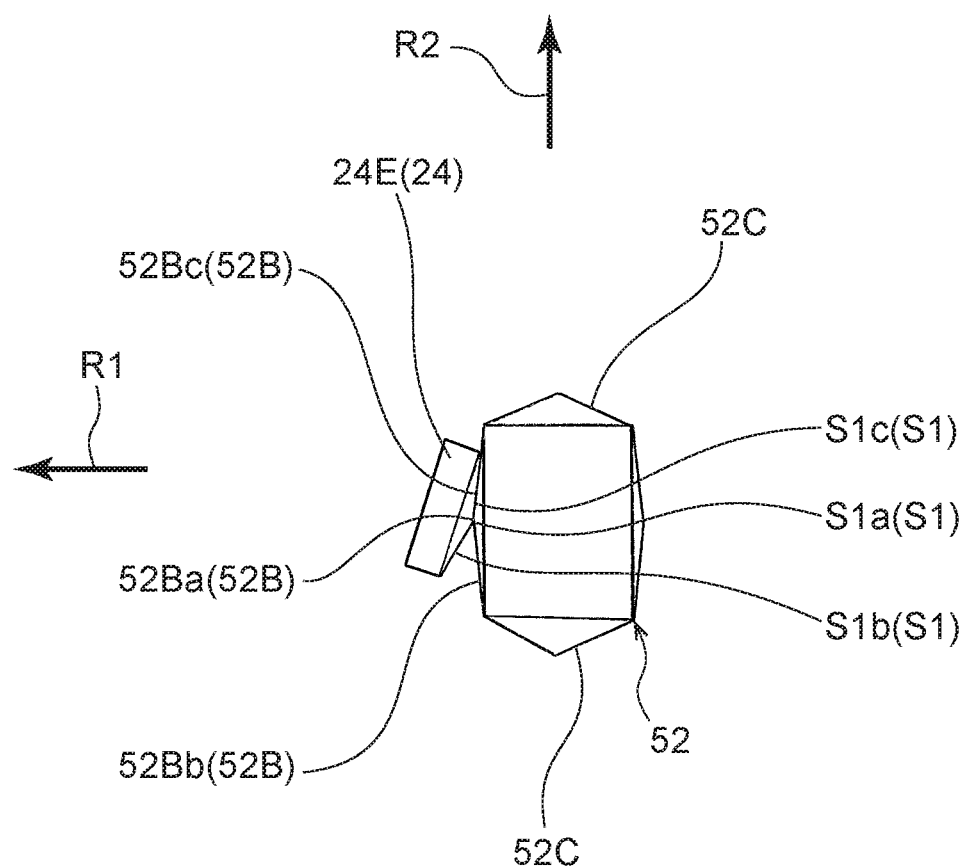
FIG. 24 is an elevation view showing an engaging portion between a slider plate and transmission gear to which a combination of the first measure and the third measure is applied, and an engaging portion between the slider plate and the fixed gear.
Figure 25:
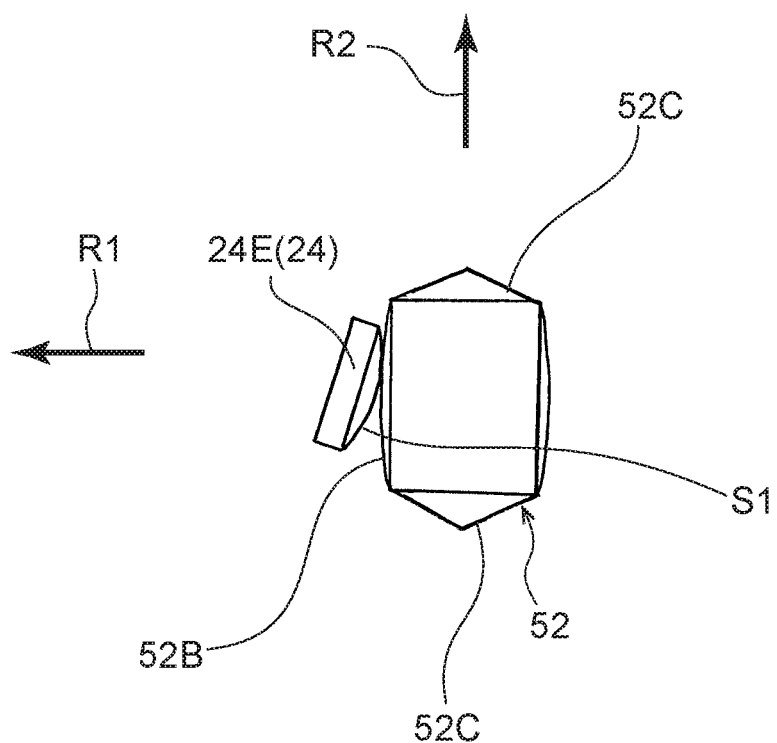
FIG. 25 is an elevation view schematically showing an engaging portion between a slider plate and transmission gear to which a combination of the second measure and the fourth measure is applied, and an engaging portion between the slider plate and the fixed gear.

Structures according to the first measure, second measure, third measure, and fourth measure described above may be combined with one another, depending on contact pressure between the transmission gear 24 and the slider plate 52 that restricts spinning of the transmission gear 24 and contact pressure between the slider plate 52 and the fixed gear 28 that supports the slider plate 52. Partial structures of the structures according to the first measure, second measure, third measure and fourth measure may be employed. For example, as shown in FIG. 24 and FIG. 25, the engaging surfaces S1 of the restricting protrusions 24E of the transmission gear 24 may be formed in convex shapes towards the respective sides thereof at which the pair of engaged surfaces 52B of the slider plate 52 are disposed as seen in the axis direction of the transmission gear 24, and the pair of engaged surfaces 52B of the slider plate 52 may be formed in convex shapes towards the respective sides thereof at which the engaging surfaces S1 of the pair of restricting protrusions 24E of the transmission gear 24 are disposed as seen in the axis direction of the transmission gear 24. That is, a structure combining the first measure with the third measure, a structure combining the second measure with the fourth measure and suchlike are possible. The same reference numerals are assigned to portions of the transmission gear 24 and slider plate 52 shown in FIG. 24 and FIG. 25 that correspond with the transmission gear 24 and slider plate 52 to which the first to fourth measures described above are applied as are assigned to the corresponding regions of the transmission gear 24 and slider plate 52 to which the first to fourth measures are applied.

The respective structures described above may be combined with one another.

Exemplary embodiments of the present disclosure are described above. However, the present disclosure is not limited by these descriptions and it will be clear that numerous modifications beyond these descriptions may be embodied within a technical scope not departing from the gist of the disclosure.

The present disclosure has been described on the basis of exemplary embodiments, but it will be clear that the present disclosure is not to be limited to these exemplary embodiments and structures. The present disclosure encompasses numerous variant examples and modifications of equivalent scope. In addition, numerous combinations and modes, as well as alternative combinations and modes that include only one element, or more or fewer elements, are within the scope and spirit of the present disclosure.

The invention claimed is:

1. A speed reducer, comprising:
a first gear that is configured to rotate upon transmission of rotary force thereto;
an eccentric shaft that is coupled to the first gear, the eccentric shaft including a support part that is offset, in a direction of a radius of rotation, from a rotation axis of the first gear;
a spinning restriction member that (i) is disposed at an outer side, in a radial direction, of the eccentric shaft and (ii) is configured to be supported at a sliding support member and to be capable of sliding with respect to the sliding support member;
a transmission gear that is supported at the support part, spinning of the transmission gear being restricted by engagement of the transmission gear with the spinning restriction member, and the transmission gear being configured to revolve around the rotation axis of the first gear as a result of rotation of the first gear together with the eccentric shaft; and
an output part that is configured to rotate as a result of revolution of the transmission gear, wherein:
the transmission gear includes a pair of restricting protrusions that are disposed spaced apart in a radial direction of the transmission gear, an entirety of the spinning restriction member being disposed in a range between the pair of restricting protrusions, each of the restricting protrusions protruding (i) toward a side of the transmission gear at which the spinning restriction member is disposed (ii) from a portion of the transmission gear further toward a radial direction inner side of the transmission gear than outer teeth that are formed at an outer periphery portion of the transmission gear, and each of the restricting protrusions including an engaging face configured to contact the spinning restriction member in a state in which the engaging face is disposed so as to oppose the spinning restriction member;
a face of each restricting protrusion other than the engaging face, as seen from an axial direction of the transmission gear, is formed in a convex shape that is convex toward an opposite side of the restricting protrusion from a side thereof at which the spinning restriction member is disposed, and
a thickness of each restricting protrusion in a direction of sliding of the spinning restriction member with respect to the sliding support member progressively increases from each end side of the restricting protrusion toward a center of the restricting protrusion in a circumferential direction of the transmission gear.

2. The speed reducer according to claim 1, wherein, as seen from the axial direction of the transmission gear, the face of each restricting protrusion that is formed in the convex shape is curved in a cylindrical surface shape.

3. The speed reducer according to claim 1, wherein a minimum thickness of each restricting protrusion at a central portion thereof in the circumferential direction of the transmission gear is greater than a minimum thickness of each restricting protrusion at an end portion thereof in the circumferential direction of the transmission gear.

4. A speed reducer-equipped motor, comprising:
a motor including a rotary shaft; and
a speed reducer according to claim 1, wherein the first gear is rotated upon transmission of rotary force of the rotary shaft thereto.

5. A speed reducer, comprising:
a first gear that is configured to rotate upon transmission of rotary force thereto;
an eccentric shaft that is coupled to the first gear, the eccentric shaft including a support part that is offset, in a direction of a radius of rotation, from a rotation axis of the first gear;
a spinning restriction member that is disposed at an outer side, in a radial direction, of the eccentric shaft;
a transmission gear that is supported at the support part, spinning of the transmission gear being restricted by engagement of the transmission gear with the spinning restriction member, and the transmission gear being configured to revolve around the rotation axis of the first gear as a result of rotation of the first gear together with the eccentric shaft; and
an output part that is configured to rotate as a result of revolution of the transmission gear, wherein:
the transmission gear includes a restricting protrusion that protrudes toward a side of the transmission gear at which the spinning restriction member is disposed and that includes an engaging face configured to contact the spinning restriction member in a state in which the engaging face is disposed so as to oppose the spinning restriction member,
a face of the restricting protrusion other than the engaging face, as seen from an axial direction of the transmission gear, is formed in a convex shape that is convex toward an opposite side of the restricting protrusion from a side thereof at which the spinning restriction member is disposed, and
as seen from the axial direction of the transmission gear, the face of the restricting protrusion that is formed in the convex shape is inflected in a polygonal shape.

6. A speed reducer, comprising:
a first gear that is configured to rotate upon transmission of rotary force thereto;
an eccentric shaft that is coupled to the first gear, the eccentric shaft including a support part that is offset, in a direction of a radius of rotation, from a rotation axis of the first gear;
a spinning restriction member that is disposed at an outer side, in a radial direction, of the eccentric shaft;
a transmission gear that is supported at the support part, spinning of the transmission gear being restricted by engagement of the transmission gear with the spinning restriction member, and the transmission gear being configured to revolve around the rotation axis of the first gear as a result of rotation of the first gear together with the eccentric shaft; and
an output part that is configured to rotate as a result of revolution of the transmission gear, wherein:
the transmission gear includes a restricting protrusion that protrudes toward a side of the transmission gear at which the spinning restriction member is disposed and that includes an engaging face configured to contact the spinning restriction member in a state in which the engaging face is disposed so as to oppose the spinning restriction member in a radial direction of the transmission gear,
the spinning restriction member includes an engaged face that the engaging face is configured to contact, and
the engaging face is disposed closer to the engaged face at a protrusion direction base end side of the restricting protrusion than at a protrusion direction distal end side of the restricting protrusion.

7. The speed reducer according to claim 6, wherein:
as seen from the radial direction of the transmission gear, the engaging face at the protrusion direction base end side of the restricting protrusion is parallel to the engaged face, and
as seen from the radial direction of the transmission gear, the engaging face at the protrusion direction distal end side of the restricting protrusion is angled toward an opposite side from a side thereof at which the engaged face is disposed.

8. The speed reducer according to claim 6, wherein:
as seen from the radial direction of the transmission gear, the engaged face at the protrusion direction base end side of the restricting protrusion is parallel to the engaging face, and
as seen from the radial direction of the transmission gear, the engaged face at the protrusion direction distal end side of the restricting protrusion is angled toward an opposite side from a side thereof at which the engaging face is disposed.

9. The speed reducer according to claim 6, wherein, as seen from the radial direction of the transmission gear, the engaging face is curved or angled toward an opposite side from a side thereof at which the engaged face is disposed.

10. The speed reducer according to claim 6, wherein, as seen from the radial direction of the transmission gear, the engaged face is curved or angled toward an opposite side from a side thereof at which the engaging face is disposed.

11. The speed reducer according to claim 6, wherein:
the transmission gear includes a pair of the restricting protrusions, which are disposed spaced apart in the radial direction of the transmission gear, and
the spinning restriction member is disposed between the pair of restricting protrusions.

12. A speed reducer, comprising:
a first gear that is configured to rotate upon transmission of rotary force thereto;
an eccentric shaft that is coupled to the first gear, the eccentric shaft including a support part that is offset, in a direction of a radius of rotation, from a rotation axis of the first gear;
a spinning restriction member that is disposed at an outer side, in a radial direction, of the eccentric shaft;
a transmission gear that is supported at the support part, spinning of the transmission gear being restricted by engagement of the transmission gear with the spinning restriction member, and the transmission gear being configured to revolve around the rotation axis of the first gear as a result of rotation of the first gear together with the eccentric shaft;
a sliding support member configured to support the spinning restriction member slidably in the direction of the radius of rotation of the first gear, the spinning restriction member being configured to slide at the sliding support member as a result of revolution of the transmission gear; and
an output part that is configured to rotate as a result of revolution of the transmission gear, wherein:
the transmission gear includes a restricting protrusion that protrudes toward a side of the transmission gear at which the spinning restriction member is disposed and that includes an engaging face configured to contact the spinning restriction member in a state in which the engaging face is disposed so as to oppose the spinning restriction member in a radial direction of the transmission gear,
the spinning restriction member includes an engaged face and a first slider face, the engaging face being configured to contact the engaged face, and the first slider face being configured to slide against the sliding support member,
the sliding support member includes a second slider face configured to slide against the first slider face, and
as seen from an axial direction of the transmission gear, at least one of the engaging face or the engaged face is formed in a convex shape that is convex toward a side thereof at which the engaging face or the engaged face is disposed.

13. The speed reducer according to claim 12, wherein:
as seen from the axial direction of the transmission gear, the at least one of the engaging face or the engaged face is inflected at a central portion thereof in a circumferential direction of the transmission gear, and
as seen from the axial direction of the transmission gear, the at least one of the engaging face or the engaged face is formed in planar shapes at both sides of the inflected portion in the circumferential direction of the transmission gear.

14. The speed reducer according to claim 12, wherein, as seen from the axial direction of the transmission gear, the at least one of the engaging face or the engaged face is curved in a cylindrical surface shape.

15. A speed reducer, comprising:
a first gear that is configured to rotate upon transmission of rotary force thereto;
an eccentric shaft that is coupled to the first gear, the eccentric shaft including a support part that is offset, in a direction of a radius of rotation, from a rotation axis of the first gear;
a spinning restriction member that is disposed at an outer side, in a radial direction, of the eccentric shaft;
a transmission gear that is supported at the support part, spinning of the transmission gear being restricted by engagement of the transmission gear with the spinning restriction member, and the transmission gear being configured to revolve around the rotation axis of the first gear as a result of rotation of the first gear together with the eccentric shaft;
a sliding support member configured to support the spinning restriction member slidably in the direction of the radius of rotation of the first gear, the spinning restriction member being configured to slide at the sliding support member as a result of revolution of the transmission gear; and
an output part that is configured to rotate as a result of revolution of the transmission gear, wherein:
the transmission gear includes a restricting protrusion that protrudes toward a side of the transmission gear at which the spinning restriction member is disposed and that includes an engaging face configured to contact the spinning restriction member in a state in which the engaging face is disposed so as to oppose the spinning restriction member in a radial direction of the transmission gear,
the spinning restriction member includes an engaged face and a first slider face, the engaging face being configured to contact the engaged face, and the first slider face being configured to slide against the sliding support member, the sliding support member includes a second slider face configured to slide against the first slider face, and as seen from an axial direction of the transmission gear, the first slider face is formed in a convex shape that is convex toward a side thereof at which the second slider face is disposed.

16. The speed reducer according to claim 15, wherein, as seen from the axial direction of the transmission gear, at least one of the engaging face or the engaged face is formed in a convex shape that is convex toward a side thereof at which the engaging face or the engaged face is disposed.

17. The speed reducer according to claim 15, wherein:

as seen from the axial direction of the transmission gear, the first slider face is inflected at a central portion thereof in a sliding direction of the spinning restriction member, and as seen from the axial direction of the transmission gear, the first slider face is formed in planar shapes at both sides of the inflected portion in the sliding direction of the spinning restriction member.

18. The speed reducer according to claim 15, wherein, as seen from the axial direction of the transmission gear, the first slider face is curved in a cylindrical surface shape.

* * * * *